United States Patent [19]
Narai et al.

[11] Patent Number: 5,298,323
[45] Date of Patent: Mar. 29, 1994

[54] BEARING STEEL AND ROLLING BEARING MADE THEREOF

[75] Inventors: Hiroshi Narai; Tsutomu Abe, both of Fujisawa; Shigeru Okita, Yokohama, all of Japan

[73] Assignee: Nippon Seiko Kabushiki Kaisha, Tokyo, Japan

[21] Appl. No.: 594,369

[22] Filed: Oct. 9, 1990

[30] Foreign Application Priority Data

Oct. 11, 1989 [JP] Japan .................................. 1-264792
Mar. 22, 1990 [JP] Japan .................................. 2-73117
Jul. 31, 1990 [JP] Japan .................................. 2-202836

[51] Int. Cl.$^5$ .............................................. B32B 18/00
[52] U.S. Cl. ...................................... 428/325; 428/329; 428/404; 428/457; 428/472; 428/469; 428/614; 428/632; 164/477; 148/328; 148/906; 420/8; 420/528
[58] Field of Search ............... 428/408, 614, 325, 329, 428/404, 472, 325, 469, 632, 457; 420/528, 8; 164/476, 477; 148/328, 906; 384/912; 387/913

[56] References Cited

U.S. PATENT DOCUMENTS

| | | | |
|---|---|---|---|
| 4,129,439 | 12/1978 | Nashiwa et al. | 420/8 |
| 4,851,052 | 7/1989 | Nishioka et al. | 164/477 |
| 4,904,094 | 2/1990 | Furumura et al. | 384/492 |
| 4,927,601 | 5/1990 | Iikubo et al. | 148/906 |
| 4,930,909 | 6/1990 | Murakami et al. | 384/912 |
| 4,992,111 | 2/1991 | Yamada et al. | 148/906 |
| 5,011,304 | 4/1991 | Murakami et al. | 384/912 |
| 5,030,017 | 7/1991 | Murakami et al. | 384/913 |

FOREIGN PATENT DOCUMENTS 53-76916 7/1978 Japan .
63-309844 12/1988 Japan .

OTHER PUBLICATIONS

"Iron and Steel" vol. 10, pp. 83–90 (1989), by: Yoshio Nuri and Kazusige Umezawa Development of Separation and Evaluation Technique of Non–Metallic Inclusions in Steel by Electron Beam Melting.
Journal Issued May 19, 1987 by Japan Society for the Promotion of Science pp. 5-1 to 5–14.
ASTM-E45 of the American National Standards Institute: "Standard Recommended Practice for Determining the Inclusion Content of Steel" (Aug. 1976).
J18-G0555, "Microscopic Testing Method for the Non-Metallic Inclusions in Steel", (1977).

Primary Examiner—Ellis P. Robinson
Assistant Examiner—Timothy M. Speer
Attorney, Agent, or Firm—Basile and Hanlon, P.C.

[57] ABSTRACT

A long-life bearing steel and a long-life rolling bearing made of the steel are disclosed. In the steel, the number of oxide or oxide-based inclusion particles in a given unit area A of 160 mm$^3$ with an average particle size of 3 to 30 μm is 80 or less and an abundance of oxide or oxide-base inclusion particles with 10 μm or more average particle size to oxide or oxide-based inclusion particles having an average particle size of 3 to 30 μm is below 2%. An electron beam melting extraction evaluation method irradiating electron beam under the following condition guarantees the cleanness of the steel: $350 V + 100 \leq J \leq 700 V + 200$, wherein J represents electric charge power in W provided by electron beam and V represents a sample volume in cm$^3$.

36 Claims, 15 Drawing Sheets

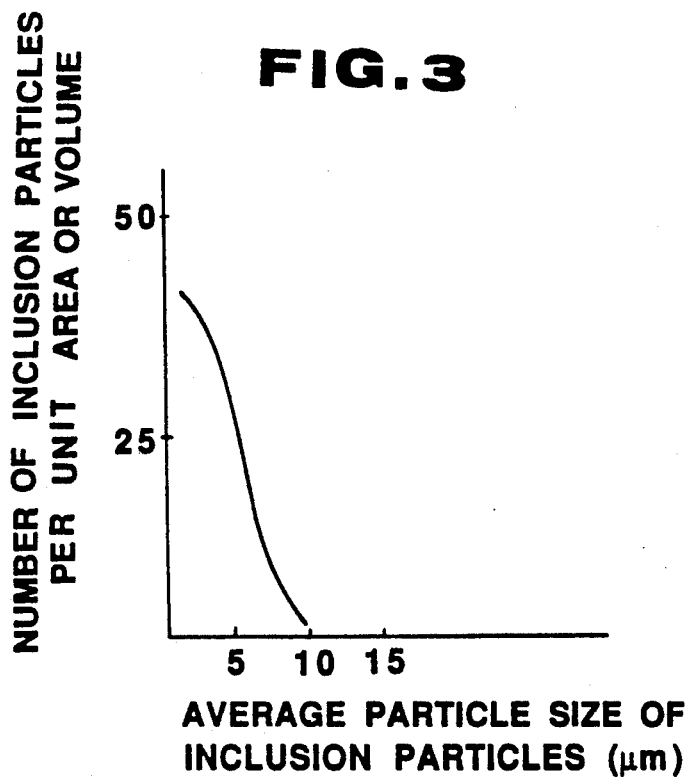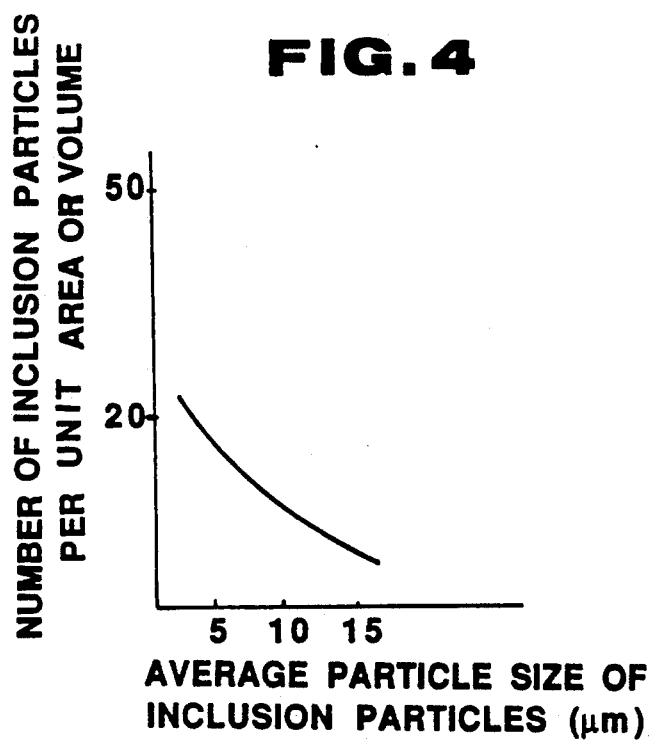

BEARING STEEL AND ROLLING BEARING MADE THEREOF

BACKGROUND OF THE INVENTION

1. Field of the Invention

The present invention relates to bearings steels and to long life rolling bearings used in automotive vehicles, agricultural machinery, construction machinery and iron-and-steel machinery and, especially, for use in transmissions and engines.

2. Description the Related Art

Conventionally, it is known that in-steel nonmetal inclusions, especially, oxide or oxide-based inclusions cause an increase, for example, in the incidence of wire breaking in wire drawing and a deterioration of the mechanical characteristics of twisting value, fatigue, etc., of a product.

Therefore, various high clean steels with a low content of in-steel oxygen have been provided. For example, Japanese unexamined patent application publication SHO. 53-76916 discloses a high clean steel, the oxygen content of which is 50 ppm or less.

The quality of steel largely depends on the number and size of nonmetal inclusion particles. Methods of determining the number and size of nonmetal inclusion particles comprises JIS-G0555, ASTM-E45 and an image-processing inclusion inspection system disclosed in Japanese unexamined patent application publication SHO. 63-309844.

Bearing life has a close relationship with the cleanness of a material. Particularly, a rolling contact part which is made of a steel with an oxide or oxide-based nonmetal inclusion (especially $Al_2O_3$) and which experiences repeated rolling contact stress may experience the occurrence of microcracks derived from the oxide or oxide-based nonmetal inclusion. This eventually leads to flaking originating from the microcrack so that the life of a rolling bearing which includes the rolling contact part expires.

In increasing bearing life, a selection of the content of in-steel oxygen or an index of inclusion in accordance with ASTM standards or a monitoring and evaluation of the size and manner of oxide or oxide-based inclusion particles present in a bearing steel guarantees the cleanness of a material in order to underlie an evaluation of bearing life.

This cleanness guarantee must require a separation of only the oxide or oxide-based nonmetal inclusion from the matrix of a sample and a monitoring and evaluation of the nonmetal inclusion. For this purpose, there is a prior-art method of monitoring and evaluating the oxide or oxide-based nonmetal inclusion using electron beam melting (see "Iron and Steel", pages 83–90, volume 10 of 75th year in 1989 and the Journal issued May 19, 1987 by the Japan Society for the Promotion of Science, pages 5-1 to 5-14).

This prior-art teaches that an electron beam completely melts a small amount of a sample in a button shape to raise and concentrate the inclusion the top surface of the resulting molten metal. A scanning electron microscope (SEM) or the like monitors and evaluates the configurations, sizes and number of oxide or oxide-based inclusion particles after cooling and solidification.

The prior art fails to specify the ranges of the number and sizes of oxide or oxide-based inclusion particles effective to increase the rolling contact fatigue life of a rolling bearing and the relationship between the bearing life and oxide or oxide-based inclusions for securing a sufficient life of a rolling bearing. On the other hand, only conventional items of cleanness evaluation can, with difficulty, discriminate long and short lives of rolling bearing in a situation in which the bearing steel has recently been required to be high-clean, so that selecting only the conventional items failed to increase the bearing life.

The prior-art electron beam melting method entails a problem in that, since it must completely melt a sample, the electric charge power at the time of electron beam generation is excessive. Controlling amount of melting is difficult when only a portion of the sample is melted. Additionally, an inclusion present in the sample below a determined depth cannot be selectively melted and raised to the top surface of the sample.

This problem is prominent especially in steel used for rolling contact parts. That is, it is known that a macroinclusion present at a position of maximum shearing stress defined by Hertz's theory of elasticity provides one of the main causes of flaking which causes termination of the life of the rolling bearing. The position of maximum shearing stress falls within a few millimeters depth from the rolling contact surface of a rolling contact part made of the rolling contact parts steel. Therefore, the material cleanness guarantee for long bearing life requires a selective separation of only an oxide or oxide-based nonmetal inclusion present within the few millimeters depth from the rolling contact surface and a monitoring and evaluation of the separated inclusion. However, the prior art electron beam melting method fails to melt part of a sample so that it cannot selectively separate and monitor macroinclusions present at the position of maximum shearing stress.

In addition, the solidified surface structure of a sample which has experienced button-shaped melting by an electron beam and then been solidified demonstrates a marked affect in distribution of rafts after solidification. This is particularly true when the solidification of the sample produces a dendritic structure on the top surface of the sample. In such instances dendrite arms or branches of the dendritic structure entrap the rafts therebetween in a non-uniform distribution which blocks the SEM or the like from monitoring and evaluating inclusions in the sample. The above problems in the electron beam melting method reduce the accuracy of the life guarantee for the rolling bearing.

A primary object of the present invention is to provide long-life bearing steel or rolling bearings by means of considering oxide or oxide-based nonmetal inclusion particles as an evaluation item for bearing life and controlling the size and number of the inclusion particles.

Another object of the present invention is to provide a long life bearing steel, the bearing life of which is guaranteed by an electron beam melting method of high accuracy capable of monitoring and evaluation of oxide or oxide-based nonmetal inclusions.

SUMMARY OF THE INVENTION

In order to achieve the objects, the present invention provides a bearing steel and rolling bearing made thereof. The bearing steel must include at least one of the three following requirements: a) the number of oxide or oxide-based inclusion particles with 3–30 μm average particle size per area unit A of 160 mm² is 80 or less and a composition ratio or abundance of oxide or oxide-based inclusion particles with 10 μm or more average particle size to the inclusion particles with 3-30 μm average particle size is below 2%; b) the number of oxide or oxide-based inclusion particles per unit volume A of 100 mm³ with 15-30 μm average particle size is 10 or less; or c) the number of oxide or oxide-based inclusion particles with 10-15 μm average particle size per unit volume A of 100 mm³ is 100 or less.

In addition, the present invention provides a bearing steel in which an electron beam melting extraction method guarantees that the carbon concentration is between about 0.06 and about 0.6 wt % and the number of the oxide or oxide-based inclusion particles per unit volume A falls within one of the above inventive ranges.

In addition, the present invention provides a bearing steel in which an electron beam melting extraction method guarantees that the number of the oxide or oxide-based inclusion particles per unit volume A falls within one of the above inventive ranges, the electron beam of the electron beam melting extraction method being irradiated under the following condition: $350 V + 100 \leq J \leq 700 V + 200$; wherein J represents electric charge power in W provided by the electron beam and V represents sample volume in cm³.

In accordance with the present invention, controlling particle sizes and the number of oxide or oxide-based inclusion particles can provide a long life bearing steel. In addition, controlling an electric power charge time for producing the electron beam can control a penetration depth in the sample so as to melt a part of the sample extending from the surface of the sample up to a target depth. Thus, the present invention can provide a bearing steel with a guaranteed long life. In addition the electron beam melting extraction evaluation method can avoid the occurrence of dendritic arms so that the present invention can provide a bearing steel with a guaranteed long life. The present invention can also provide a long life rolling bearing made of the long life bearing steel.

BRIEF DESCRIPTION OF THE DRAWINGS

FIG. 3 is a graph of a characteristic relationship between average inclusion particle sizes and the number of oxide or oxide-based inclusion particles in a long life rolling bearing in a given unit area or volume A;

FIG. 4 is a graph of a characteristic relationship between average inclusion particle size and the number of oxide or oxide-based inclusion particles in a short life rolling bearing in a given unit area or volume A;

FIG. 11(2) is cross section taken through the A—A line of the load type life testing machine of FIG. 11(1);

FIG. 18(2) is an enlargement of part of FIG. 18(1);

FIG. 18(3) is an SEM photographic image of solidified surface of a metal structure after melting of SUJ-2 steel employed in Example X of the present invention;

FIG. 18(4) is an enlargement of part of FIG. 18(3);

FIG. 19(2) is an enlargement of part of FIG. 19(1);

FIG. 19(3) is an SEM photographic image of the top surface after melting of a sample which has not been decarburized employed in Example XI of the present invention; and FIG. 19(4) is an enlargement of part of FIG. 19(3).

DETAILED DESCRIPTION OF THE INVENTION

The present invention is based on the discovery that controlling the average particle size, the number and abundance of oxide or oxide-based inclusion particles, and the content of in-steel oxygen will favorably effect the bearing life. Thus, in the present invention, the average particle size, number and abundance of oxide or oxide-based inclusion particles and the content of in-steel oxygen are taken as evaluation items for determining bearing life in order to produce a long life rolling bearing It has been unexpectedly discovered that controlling the average particle size, the number and abundance of oxide or oxide-based inclusion particles and the content of in-steel oxygen within particular ranges results in increased bearing life.

Figure 1:
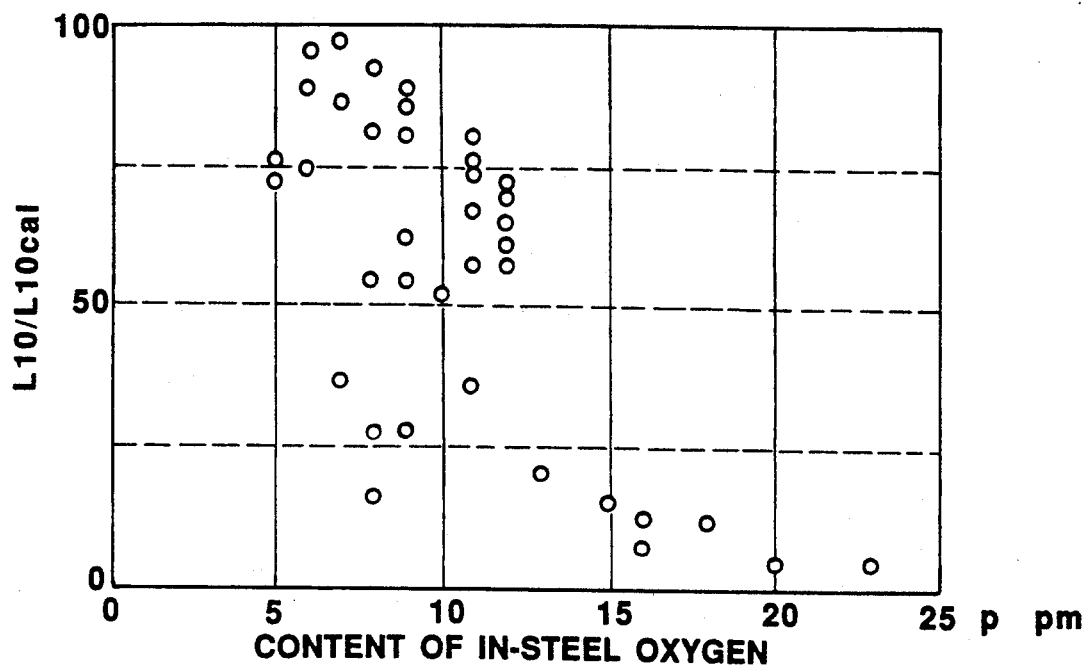
FIG. 1 is a graph of a characteristic relationship between the contents of in-steel oxygen and the results of bearing life tests for a rolling contact part.

As shown in FIG. 1, results of a thrust-load type bearing life (herein meaning $L_{10}$ life, i.e., 90% survivable life) test for a rolling bearing show that the contents of in-steel oxygen have no significant correlation in the range of low contents of in-steel oxygen; however, the bearing life is generally increased as the content of in-steel oxygen is decreased. As shown in FIG. 1 concentrations of in-steel oxygen of 9 ppm or less tend to increase the bearing life greater than higher contents thereof. The quality of the bearing life was determined to be good since the ratio of actual bearing life to calculated bearing life ($L_{10}/L_{10}cal$) was high. The thrust-load type bearing life test was conducted on disc-shaped test pieces by means of a testing machine described on pages 10–21, Special Steels Manual (1st edition), edited by Electrosteelmaking Institute, and published by Rikogakusha, on May 25, 1965. Conditions of the thrust-load type bearing life test were: $P_{max}=527$ kgf/mm$^2$, N=3,000 cpm and lubricating oil: VG 68 turbine oil.

Figure 2:
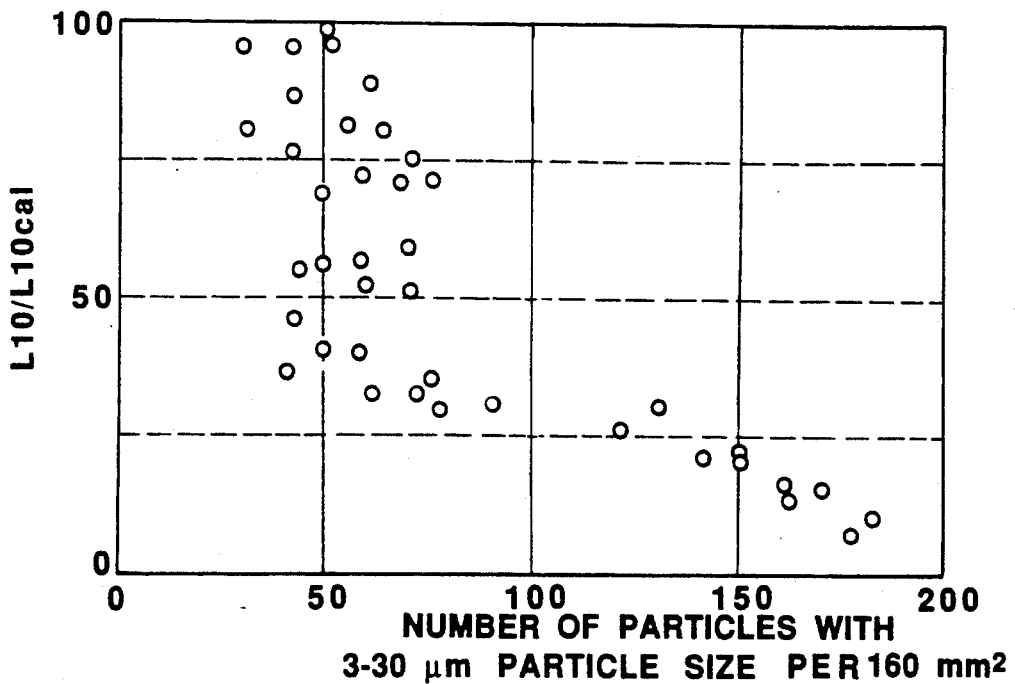
FIG. 2 is a graph of a characteristic relationship between the number of oxide or oxide-based inclusion particles with 3 to 30 μm average particle size per unit area A of 160 mm² and results of the bearing life test for a rolling contact part.

FIG. 2 represents a relationship between the number of oxide or oxide-based inclusions per unit area A of 160 mm$^2$ with an average particle size of 3 $\mu$m or more, discriminated by the maximum resolution of an optical microscope (x 400), and the life ratio $L_{10}/L_{10}cal$.

As shown in FIG. 2, the bearing life increases as a function of the number of the oxide or oxide-based inclusion particles per a unit area of 160 mm$^2$. Thus, selecting the number of oxide or oxide-based inclusion particles in a unit area of 160 mm$^2$ corresponding to a range of long bearing life can guarantee provision of a long life rolling bearing. In particular, providing that the number of oxide or oxide-base inclusions in a given unit area A of 160 mm$^2$ With 3 $\mu$m to, for example, 30 $\mu$m average particle size is 80 or less provides a long life rolling bearing. However, in this case, a deviation in the $L_{10}/L_{11}cal$ life ratio slightly increases as the number of oxide or oxide-based inclusion particles in a given unit area A of 160 mm$^2$ having an average particle size 3 to 30 $\mu$m decreases.

The particle size distribution of oxide or oxide-based inclusion particles for a long life rolling bearing and a short life rolling bearing both with an equal number of oxide or oxide-based inclusions with 3 to 30 $\mu$m average particle size in an inspection area A equal to an area of 160 mm$^2$ or a volume of 100 mm$^3$ were obtained. The results shown in FIGS. 3 and 4. As seen in FIGS. 3 and 4, the particle size distribution of oxide or oxide-based inclusion particles generally has a maximum toward the smallest average particle size and a tendency toward decreasing the number of oxide or oxide-based inclusion particles as average particle size increases. This is particularly apparent in the particle size distribution of oxide or oxide-based inclusion particles in a long life rolling bearing which exhibits a sharp increase from a 10 $\mu$m average particle size towards the smallest average. In contrast, the particle size distribution of oxide or oxide-based inclusion particles in the short life rolling bearing is flatter or broader and has a skirt extending beyond the point of 10 $\mu$m average particle size. Thus, reducing an abundance of oxide or oxide-based inclusion particles with 10 $\mu$m or more average particle size within the range shown in FIG. 3 can guarantee a long life rolling bearing.

Figure 5:
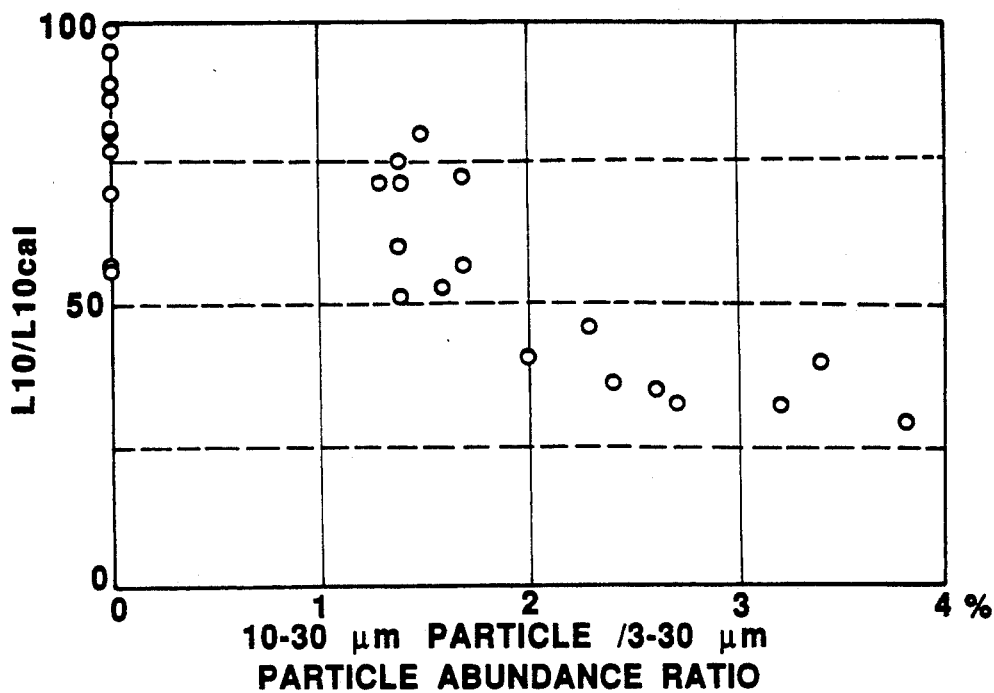
FIG. 5 is a graph of a characteristic relationship between abundances of oxide or oxide-based inclusion particles with 10 to 30 μm average particle size and bearing lives of a rolling contact part.

FIG. 5 represents a relationship between the abundance of oxide or oxide-based inclusion particles having a 10 to 30 $\mu$m average particle size and bearing life. As seen in FIG. 5, selection of an abundance of oxide or oxide-based inclusion particles with a 10 to 30 $\mu$m average particle size below 2% of the total particle abundance guarantees provision of a long life rolling bearing. Even when oxide or oxide-based inclusion particles have a 10 to 13 $\mu$m average particle size, the abundance of oxide or oxide-based inclusion particles with a 10 to 13 $\mu$m average particle size selected is below 2% of the total particle abundance.

Figure 6:
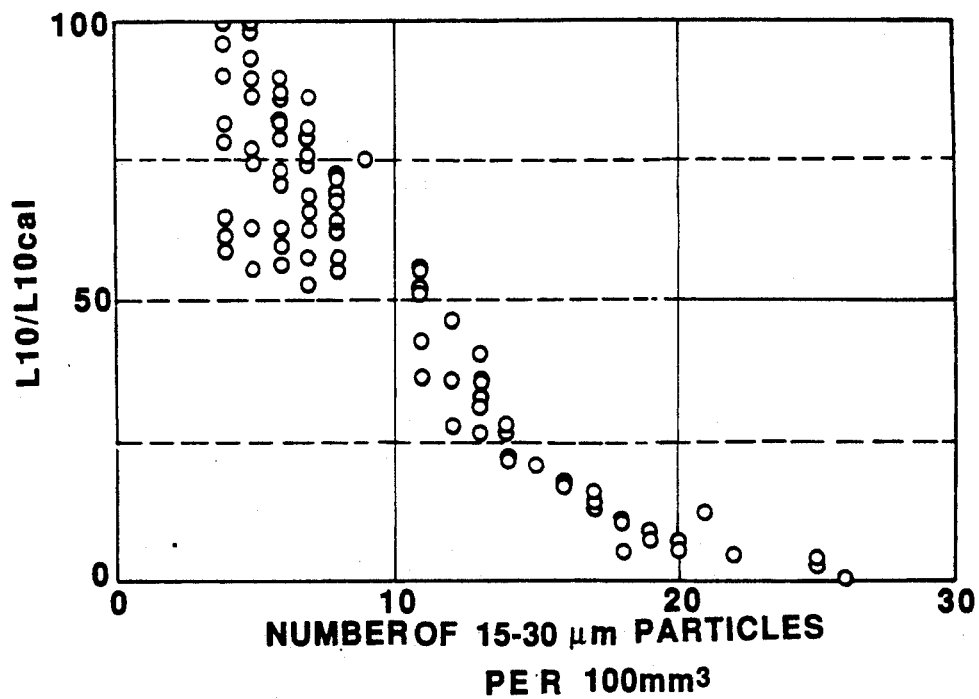
FIG. 6 is a graph of a characteristic relationship between the number of oxide or oxide-based inclusion particles with 15 to 30 μm average particle size and bearing lives of a rolling contact part in a given volume A of 100 mm³.

In addition to the method of determining the number of oxide or oxide-based inclusion particles present on the surface of a steel, the present invention also includes and discloses an accurate spatial evaluation method of extracting oxide or oxide-based inclusion particles out of the steel and measuring the number thereof. More particularly this invention includes and discloses an accurate electron beam melting extraction evaluation method in which oxide or oxide-based inclusion particles are extracted out of the steel and the number of extracted particles are evaluated. Thus, the spatial evaluation method of the present invention provides a relationship between the number of oxide or oxide-based inclusion particles in a given unit volume A equal to 100 mm$^3$ having 15 $\mu$m to, for example, 30 $\mu$m average particle size and bearing lives in which bearing life is increased as the number of oxide or oxide-based inclusion particles in a unit volume A equal to 100 mm$^3$ is increased as seen in FIG. 6.

Thus, selecting the number of oxide or oxide-based inclusion particles with 15 to 30 $\mu$m average particle size can guarantee a long life rolling bearing. Especially, selecting the number of oxide or oxide-based inclusion particles in a given volume A equal to 100 mm$^3$ with 15 to 30 $\mu$m average particle size to be 10 or less provides a long life rolling bearing.

Figure 7:
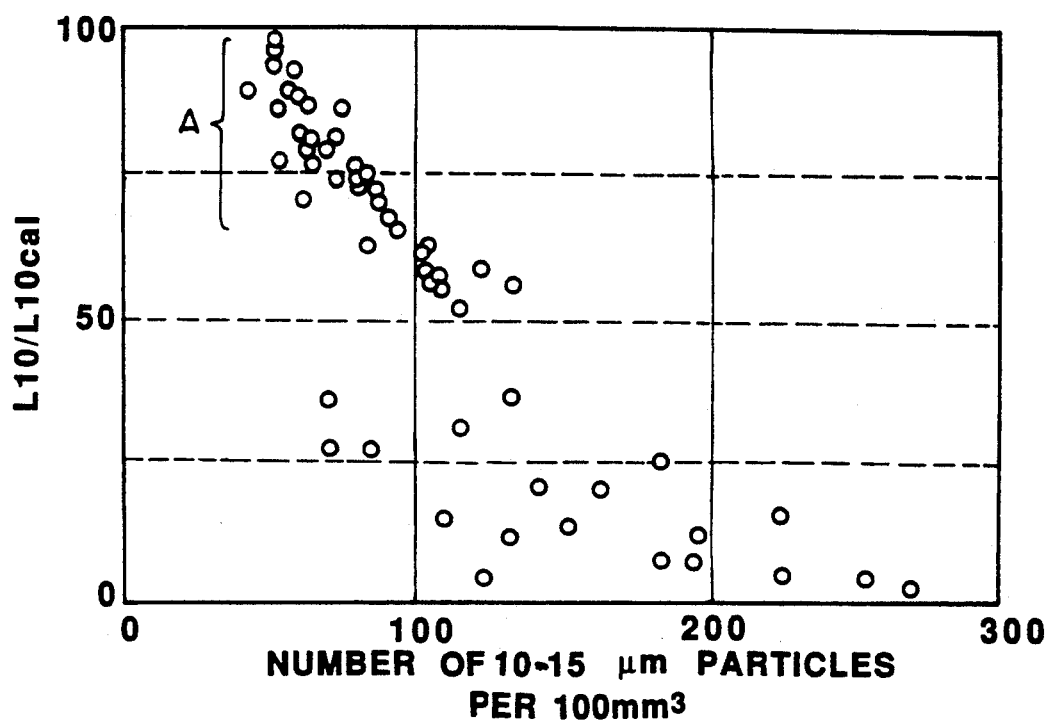
FIG. 7 is a graph of a characteristic relationship between the number of oxide or oxide-based inclusion particles with 10 to 15 μm average particle size and bearing lives of a rolling contact part in a given volume A of 100 mm³.

FIG. 7 represents a relationship between the number of oxide or oxide-based inclusion particles in a unit volume A of 100 mm$^3$ with lo to 15 $\mu$m average particle size and bearing life. As seen in FIG. 7, material containing oxide or oxide-based inclusion particles with 10 to 15 $\mu$m average particle size in a unit area of 100 mm$^3$ present in concentrations of 100 or less exhibits increased bearing life. In particular, a sample including concentration value of 10 or less of oxide or oxide-based inclusion particles having 10 to 15 $\mu$m average particle size and 9 ppm content of in-steel oxygen in a unit volume A equal to 100 mm$^3$ exhibits a characteristic A-region show in FIG. 7 so that the bearing life and number of oxide or oxide-based inclusion particles exhibits a sufficiently good correlation therebetween. Thus, selecting the number of oxide or oxide-based inclusion particles and the content of in-steel oxygen guarantees a predetermined bearing life.

Selecting the number of oxide or oxide-based inclusion particles in a unit volume A equal to 100 mm³ with 15 to 30 μm average particle size to be 10 or less, or the number of oxide or oxide-based inclusion particles in a unit volume A equal to 100 mm³ with 10 to 15 μm average particle size to be 100 or less, or the number of oxide or oxide-based particles in a given volume A equal to 100 mm³ with 15 to 30 μm average particle size to be 10 or less and, further, the number of oxide or oxide-based inclusion particles in a given volume A equal to 100 mm³ with a 10 to 15 μm average particle size of 100 or less provides a long life rolling bearing.

It has been unexpectedly discovered that controlling an electric charge power fed by an electron beam within a range determined by the volume of a sample and controlling electric power charge time to provide a controlled penetration depth in a given sample essentially in proportion to the electric power charge time is effective in providing long-life rolling bearings. As used herein, the term electric charge power is defined as an irradiation energy time of the electron beam.

Figure 8:
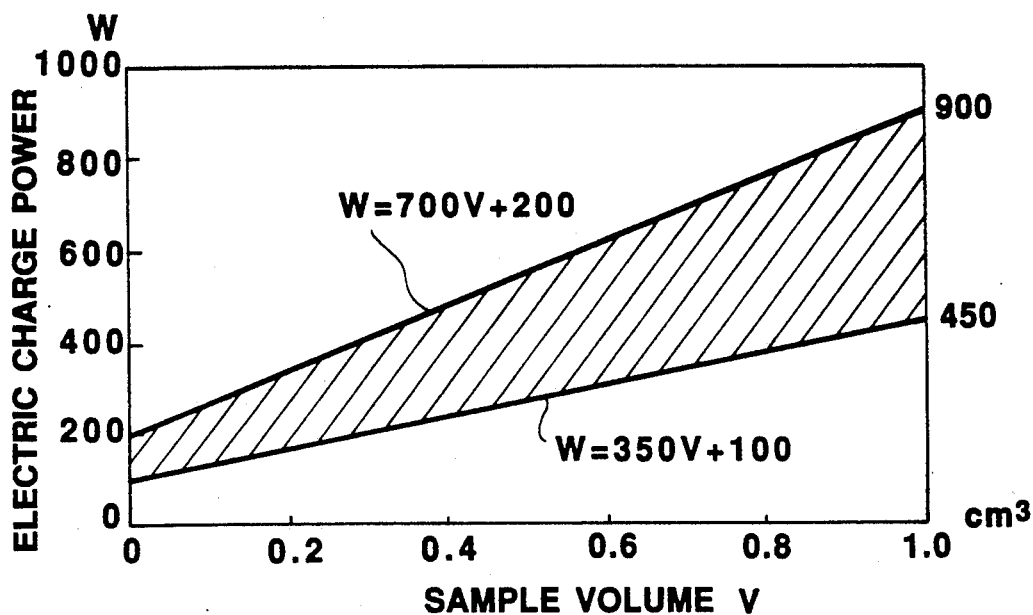
FIG. 8 is a graph of a characteristic relationship between sample volumes and electric charge powers for producing an electron beam.
Figure 9:
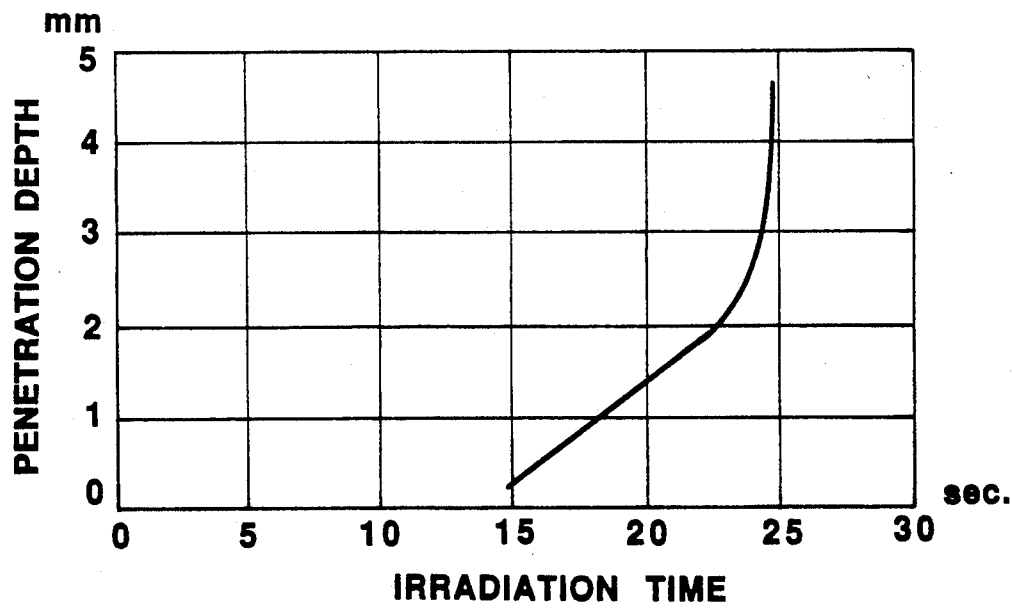
FIG. 9 is a graph of a characteristic relationship between irradiation times of electron beam and penetration depths in a sample.

FIG. 8 represents the operations of electric charge power (w) versus the volume (cm³) of sample characterizing a melting condition of sample produced by the electron beam melting method The hatched range, 350 V+100≦J≦700 V+200, represents a range in which the penetration depth in the sample is controllable in proportion to a charge time of electric power. FIG. 9 represents the characteristic relationship between a charge time of electric power (i.e., the irradiation time of he electron beam) for producing the electron beam and the penetration depth in which acceleration voltage and beam current of the electron beam are fixed. As seen in FIG. 9, the penetration depth is proportional to the charge time of power after sample melting starts. Thus, controlling the charge time of electric power also controls the penetration depth in the sample. The electron beam melting method of the present invention is advantageous in that it partially melts a sample thereby requiring only a low energy input in sample melting and facilitates electron beam energy control.

When the electron beam melting method of the present invention is applied to a sample of steel used for rolling contact parts, power charge time control freely provides a penetration depth within 2 mm in proportion to the charge time. Thus, the electron beam melting method of the present invention can separate oxide or oxide-based nonmetal inclusions present at the maximum shearing stress position of a rolling contact part from any oxide or oxide-based nonmetal inclusion present at another position of the rolling contact part It can also monitor and evaluate the former oxide or oxide-based nonmetal inclusion and thereby increase the evaluation accuracy of the rolling contact fatigue life of the rolling contact part.

An electric charge power exceeding the upper limit illustrated in FIG. 8 renders it difficult to control the penetration depth caused by the electric power charge time control. On the other hand, an electric charge power below the lower limit illustrated in FIG. 8 produces insufficient energy density and causes nonuniform surface melting of the melted portion which makes selection of the melted portion difficult. Electric charge power below the lower limit set forth in FIG. 8 fails to produce significant correlation between the electric power charge time and penetration depth. Both cases fail to produce a proportional relationship between the electric power charge time and penetration depth.

In conventional procedures, the main method of analyzing the origin of an incidence of rolling contact fatigue is to monitor the interior of the flaking region by means of SEM or the like. This method often fails to locate the origin of rolling contact fatigue because of a wear region or the like in a fractured surface in the rolling contact part caused by flaking. When the origin of rolling contact fatigue is located, the operation of the rolling bearing must be stopped at the stage of crack formation before flaking has occurred and the freshly fractured surface must be monitored and analyzed before further wear has occurred. A method has been proposed which senses a crack produced in a test piece as a result of thrust-load type life test by an acoustic emission (A.E.) method, and immediately stops the life-testing machine and analyzes the origin of rolling contact fatigue (see Japanese patent application HEI 1-318011 and Japanese Society of Lubrication Engineers, brief for the 33rd spring study presentation meeting held in 1989, pages 213–216).

A combination of the electron beam melting method of the present invention and a nondestructive inspection (e.g., a rolling contact fatigue origin analysis using the AE method) for previewing various deficiencies present in the rolling bearing when present as a microcrack provides a novel evaluation technique for nonmetal inclusion-caused flaking origin analysis for rolling contact fatigue life. The combination of methods can locate the macroinclusions which cause the microcrack and selectively separate the selected macroinclusion and raise it to the surface of a sample in order to monitor and evaluate it.

Testing the relationship between the solidification structure after electron beam melting and its chemical composition indicates that the production of a dendritic structure is closely dependent on in-sample carbon concentration and indicates that certain in-sample carbon concentrations are appropriate for preventing a production of dendritic structure.

Figure 10:
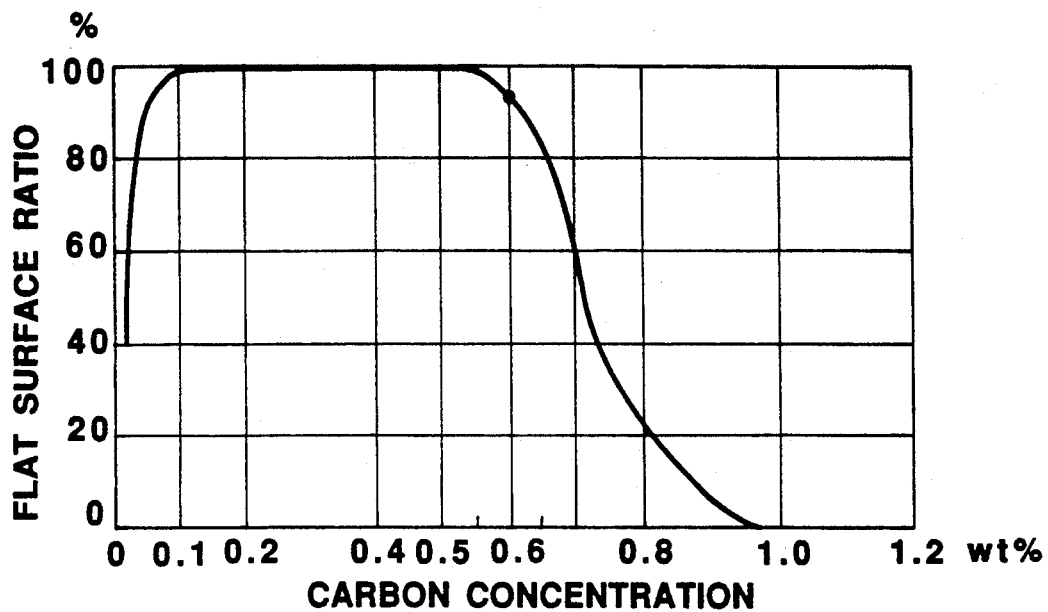
FIG. 10 is a graph of a characteristic relationship between flat surface ratios and in-sample carbon concentrations.

Since the production of dendritic structures undermines the flatness of a monitored surface testing the relationship between a flat surface ratio (the projected area of flat surface free from dendritic structure or the like/total projected area of monitored surface) and the in-sample carbon concentration was conducted. FIG. 10 is a graph of the relationship between the flat surface ratio and in-sample carbon concentration.

As seen in FIG. 10, as the in-sample carbon concentration increases and especially, when the carbon concentration slightly exceeds 0.5 wt %, the flat surface ratio significantly begins to decrease. When the in-sample carbon concentration is near 1 wt %, a dendritic structure covers almost all of the monitored surface. On the other hand, when the in-sample carbon concentration is 0.1 wt % or less, the flat surface ratio is significantly decreased.

In order to well distribute rafts extracted by the electron beam melting method and to facilitate monitoring and evaluation of the rafts, the flat surface ratio was 90% or more. A 90% or more flat surface ratio reduces production of dendritic structures so that the dendritic structure is less likely to entrap a raft. Thus, the rafts were uniformly distributed to facilitate their monitoring and evaluation. A 0.06–0.6 wt % in-sample carbon concentration provided the desired 90% or more flat surface ratio. Even more particularly, a 0.1-0.5 wt % in-sample carbon concentration providing the 100% flat surface ratio is preferable. As employed herein, the in-sample carbon concentration may be a postdecarburization value.

The utility of preventing a production of dendritic structure is especially significant in carburized bearing steel, e.g., SCr42OH, SCM42OH, SNCM22OH and SNCM815 (in JIS G4052 and JIS G4103).

When electric power was charged under predetermined conditions in order to produce electron beam, an electron beam melting of a sample having a predetermined in-sample carbon concentration of 0.06 to 0.6 wt % up to a target depth measured from the surface of the sample, separated an oxide or oxide-based inclusion present at a spot of the sample of the target depth to derive a raft from the oxide or oxide-based inclusion so that the present invention can well monitor and evaluate the raft, preventing the production of dendritic structure.

Having thus described the present invention, the following Examples are included to further illustrate the present invention. These Examples are included for illustrative purposes and are not to be construed as limitative of the invention or its scope.

EXAMPLE I

Bearing steel samples were obtained for evaluation and testing. It can be appreciated that the bearing steel may be prepared by a variety of methods, including vacuum induction melting (VIM), vacuum arc remelting (VAR), electro slag remelting, etc. Furthermore, these methods may be used individually or in combination (eg., a combination of VIM-VAR).

In the present instance, samples of bearing steels were prepared in the following manner. Scraps of steel were melted by an electric furnace or blast furnace to produce melted pig iron. The pig iron was transferred to a basic oxygen furnace and the components were adjusted as necessary. This melted steel was transferred to a ladle furnace and a vacuum degassing process was applied to a desired bearing steel.

Sequential forming, quenching and tempering SUJ-2 bearing steels of 10 different charges produced disc-shaped test pieces. The thrust-load type life testing machine as described previously measured an $L_{10}$ life of each of the disc-shaped test pieces. The bearing life of the test piece is represented in terms of the total number of revolutions of the test piece up to the point at which the test piece experienced failure evidenced by flaking or cracking.

Tested single-row deep-grooved ball bearings (6202) were manufactured from the quenched and tempered SUJ-2 bearing steels. A radial-load type life testing machine of FIG. 11 measured the $L_{10}$ lives of the tested ball bearings. The bearing life of each of the tested ball bearings is represented in terms of the total number of revolutions of the tested ball bearing until the raceway surface of the inner or outer race or the surface of the rolling element has experienced the occurrence of flaking as well as the number of vibrations the tested ball bearing has experienced equals or exceeds a predetermined value.

Figure 11A:
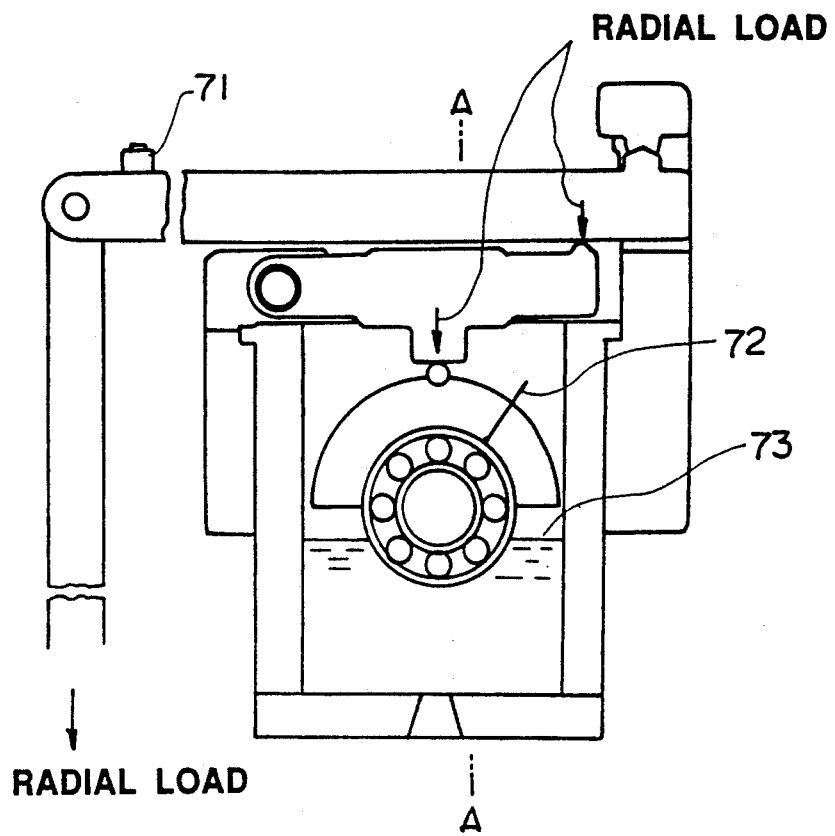
FIG. 11(1) is a front view of a radial-load type life testing machine.
Figure 11B:
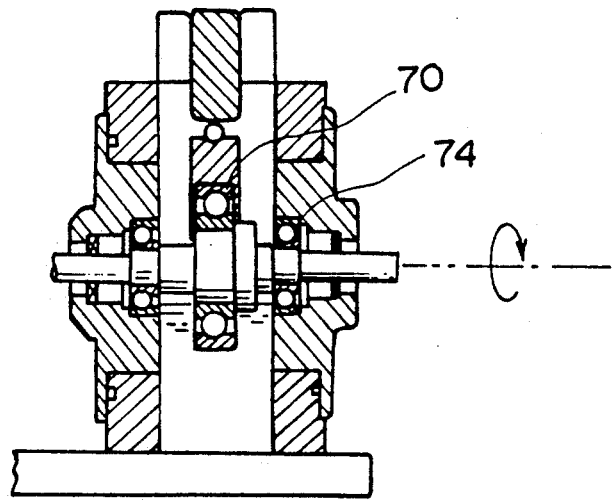

FIG. 11(1) illustrates the front of the radial-load type life testing machine. FIG. 11(2) is a cross-sectional view through the A—A line of the radial-load type life testing machine of FIG. 11(1). In FIGS. 11(1) and 11(2), a tested rolling bearing is indicated as 70, a vibration sensing terminal is indicated as 71, a thermocouple is indicated as 72, the level of oil is indicated as 73 and a support rolling bearing installed in the radial-load type life testing machine is indicated as 74. As shown in FIGS. 11(1) and (2), the tested rolling bearing 70 receives a radial load.

Test conditions provided by the radial-load type life testing machine were as follows:
Radial load: 1,410 kgf,
Rotational speed: 3,900 rpm with the inner race rotating and the outer race of the tested ball bearing fixed,
Lubricant FBKRO-69 turbine oil, and
$P_{max}$: 355 kgf/mm$^2$.

The number of oxide or oxide-based inclusion particles in a unit area A equal to 160 mm$^2$ with 3 to 30 μm average particle size and an abundance of oxide or oxide-based inclusion particles with 10 to 30 μm average particle size in a part of a life-tested sample was specularly polished were measured with a suitable device such as an optical microscope or electron microscope image analyzer. A suitable optical microscope image analyzer comprises an optical microscope, TV camera, TV screen, and counter. In the operation of the optical microscope image analyzer, the optical microscope produces an analog image, the TV camera picks up the image, projects it onto the TV screen and scans the projected image with an electron beam to convert brightnesses and darknesses of the projected image to a series of electrical signals, and the counter provides the number and particle sizes of the oxide or oxide-based inclusion particles.

In Example I, changing charges of SUJ-2 bearing steel changed the number of oxide or oxide-based inclusion particles of an average particle size and an abundance of oxide or oxide-based inclusion particles with a particular particle size. Bearing lives of disc-shaped test pieces and single-row deep-grooved ball bearings made of the resulting SUJ-2 bearing steels of different charges were measured. Tables 1 and 2 represent the results of this measurement.

Bearing life of each of the disc-shaped test pieces and each of the tested ball bearings was determined to be long or good when measured as a ratio of actual bearing life to calculated bearing life value (i.e., $L_{10}/L_{11}$cal value) when that ratio was high. On the other hand, the bearing life thereof was determined to be short or poor when the $L_{10}/L_{10}$cal value was low. Underlined values of all of Tables are outside the inventive ranges.

TABLE 1

| | Results of thrust-load type life test | | |
|---|---|---|---|
| Charge No. | Number of inclusion particles in unit A area | | Results of life test |
| | 3-30 μm | 10-30 μm (%) | $L_{10}/L_{10}$cal |
| 1 | 31 | 0 | 96 |
| 2 | 50 | 0 | 69 |
| 3 | 43 | 0 | 76 |
| 4 | 59 | 1.7 | 57 |
| 5 | 69 | 1.4 | 71 |
| 6 | 41 | 2.4 | 36 |
| 7 | 62 | 3.2 | 33 |
| 8 | 131 | 3.1 | 30 |
| 9 | 151 | 4.6 | 23 |
| 10 | 171 | 4.7 | 15 |

TABLE 2

Results of radial-load type life test

| Charge No. | Number of inclusion particles in unit area A | | Results of life test $L_{10}/L_{10}cal$ |
|---|---|---|---|
| | 3–30 μm | 10–30 μm (%) | |
| 11 | 32 | 0 | 80 |
| 12 | 44 | 0 | 87 |
| 13 | 53 | 0 | 96 |
| 14 | 65 | 1.5 | 80 |
| 15 | 71 | 1.4 | 60 |
| 16 | 59 | 3.4 | 40 |
| 17 | 78 | 3.8 | 30 |
| 18 | 142 | 4.2 | 22 |
| 19 | 162 | 6.2 | 13 |
| 20 | 178 | 6.7 | 7 |

Figure 12:
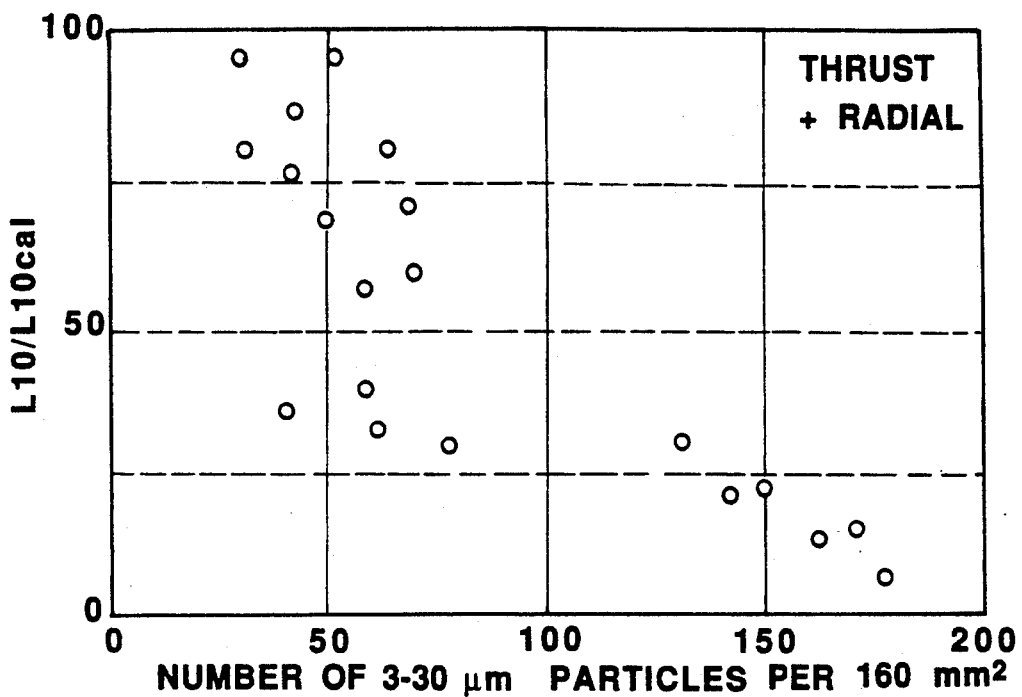
FIG. 12 is a graph of a characteristic relationship between the number of oxide or oxide-based inclusion particles with a 3 to 30 μm average particle size per unit area A of 160 mm² and the results of the life test for a rolling contact part.

The results of the thrust-load type and radial-load type life tests of Tables 1 and 2 are plotted in FIG. 12.

As seen in Tables 1 and 2 and FIG. 12, the bearing lives of the disc-shaped test pieces of Charge Nos. 1–5 and the tested ball bearings of Charge Nos. 11–15, each of which has 80 or less oxide or oxide-based inclusion particles in a unit area A equal to 160 mm² with 3 to 30 μm average particle size and an abundance of oxide or oxide-based inclusion particles with 10–30 μm average particle size of less than 2% of the total are good.

On the other hand, the bearing lives of the disc-shaped test pieces of Charge Nos. 6 and 7 and tested ball bearings of change Nos. 16 and 17, each of which has an abundance of oxide or oxide-based inclusion particles with 10 to 30 μm average particle size above 2% of the total exhibited poor bearing life. The test pieces of Charge Nos. 8 to 10 and tested ball bearings of changes Nos. 18 to 20, each have an abundance of oxide or oxide-based inclusion particles with 10 to 30 μm average particle size above 2% of the total and have above 80 oxide or oxide-based inclusion particles in a unit area A equal to 160 mm² with 3 to 30 μm average particle size. These samples exhibited poor bearing life.

EXAMPLE II

Thrust-load type and radial-load type life tests were conducted for disc-shaped test pieces and tested ball bearings in essentially the same manner as set forth in Example I. In Example II, the relationship between the number of oxide or oxide-based inclusion particles in a unit volume A equal to 100 mm³ with 15 to 30 μm average particle size and bearing lives of disc-shaped test pieces and tested ball bearings were tested.

An electron beam melting extraction method determined the number of oxide or oxide-based inclusion particles in a given volume A equal to 100 mm³ and the average particle size thereof. The electron beam melting extraction method, which extracts an inclusion particle out of a steel sample and spatially analyzes the inclusion particle, provides a more accurate measurement than the method employed in Example I for determining an inclusion present on the top surface of a sample by means of an optical or electron microscope.

In the electron beam melting extraction method employed in Example II, an electron beam melts a metal sample in the form of button in a water-cooled copper crucible under high vacuum. Inclusions or rafts floating on the top of the melting surface of the sample are collected. The collected inclusions are separated from the sample by an electrolytic polishing operation after which the optical or electron microscope image analyzer or visual observation can be employed to determine particle sizes and the number of the inclusion particles.

Figure 13:
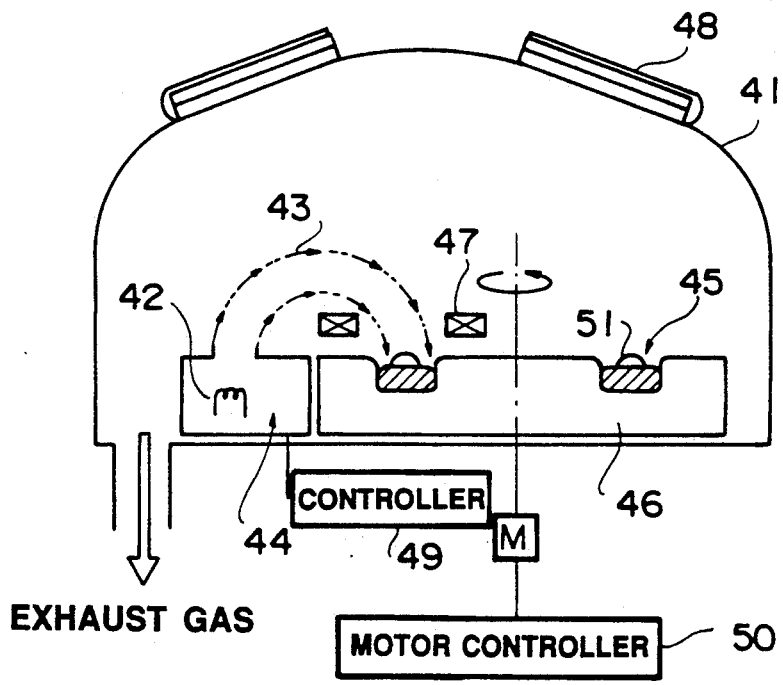
FIG. 13 is a schematic diagram of an electron beam melting apparatus according to the second embodiment of the present invention.

The electron beam melting apparatus of the present invention employed in Example II is schematically illustrated in FIG. 13. The electron beam melting apparatus comprises a vacuum chamber defining vessel 41 producing a high vacuum, an electron gun 44 containing a filament 42 capable of accelerating electrons emitting from the filament 42 and projecting them in an electron beam 43, a water-cooled copper crucible 46 rotatable about the axis thereof capable of receiving a plurality of samples 45, a deflection coil 47 deflecting the electron beam 43 projected by the electron gun 44 to a sample 45, monitoring windows 48 for viewing the interior of the vacuum chamber defining vessel 41, a voltage and current controller 49 controlling beam acceleration voltage and beam current of the electron gun 44 so that an electric charge power falls within optimal range shown in the hatched region of FIG. 8, and a motor controller 50 controlling a water-cooled crucible drive motor M to move one pitch at a time predetermined for each sample. The electron beam melting apparatus directs an electron beam onto a sample 45 to melt it and raise oxide or oxide-based inclusion particles to the top surface of the sample 45 so as to produce a raft 51.

The results of the analysis of particle sizes and the number of oxide or oxide-based inclusion particles analyzed by this method are summarized in Tables 3 and 4. The results of the thrust-load type and radial-load type life tests of Tables 3 and 4 are plotted in FIG. 14.

TABLE 3

Results of thrust-load type life test

| Charge No. | Number of inclusion particles with 15–30 μm average particle size | Results of life test $L_{10}/L_{10}cal$ |
|---|---|---|
| 21 | 4 | 90 |
| 22 | 4 | 65 |
| 23 | 6 | 71 |
| 24 | 7 | 63 |
| 25 | 10 | 57 |
| 26 | 13 | 30 |
| 27 | 14 | 22 |
| 28 | 17 | 13 |
| 29 | 20 | 6 |
| 30 | 26 | 2 |

TABLE 4

Results of radial-load type life test

| Charge No. | Number of inclusion particles with 15–30 μm average particle size | Results of life test $L_{10}/L_{10}cal$ |
|---|---|---|
| 31 | 4 | 99 |
| 32 | 4 | 78 |
| 33 | 6 | 86 |
| 34 | 6 | 60 |
| 35 | 8 | 65 |
| 36 | 11 | 42 |
| 37 | 13 | 26 |
| 38 | 16 | 18 |
| 39 | 19 | 9 |
| 40 | 22 | 5 |

Figure 14:
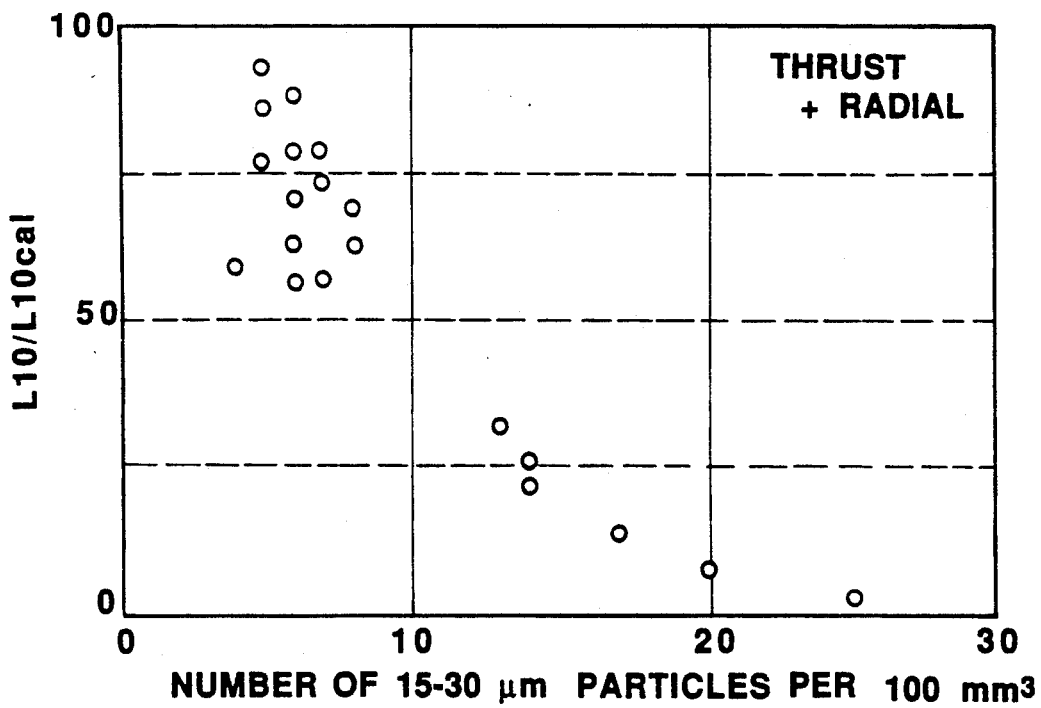
FIG. 14 is a graph of a characteristic relationship between the number of oxide or oxide-based inclusion particles with a 3 to 30 μm average particle size per unit volume A of 100 mm³ and bearing lives of rolling contact part.

As seen in Tables 3 and 4 and FIG. 14, the bearing lives of the disc-shaped test pieces of Charge Nos. 21–25 and the tested ball bearings of Charge Nos. 31–35, each of whic has 10 or less oxide or oxide-based inclusion particles in a given unit volume A equal to 100 mm³ with 15 to 30 μm average particle size, are good.

On the other hand, the bearing lives of the disc-shaped test pieces of Charge Nos. 26–30 and tested ball bearings of Charge Nos. 36–40, each of which has above 10 oxide or oxide-based inclusion particles in a given volume A equal to 100 mm$^3$ with 15 to 30 μm average particle size, are poor.

EXAMPLE III

Figure 15:
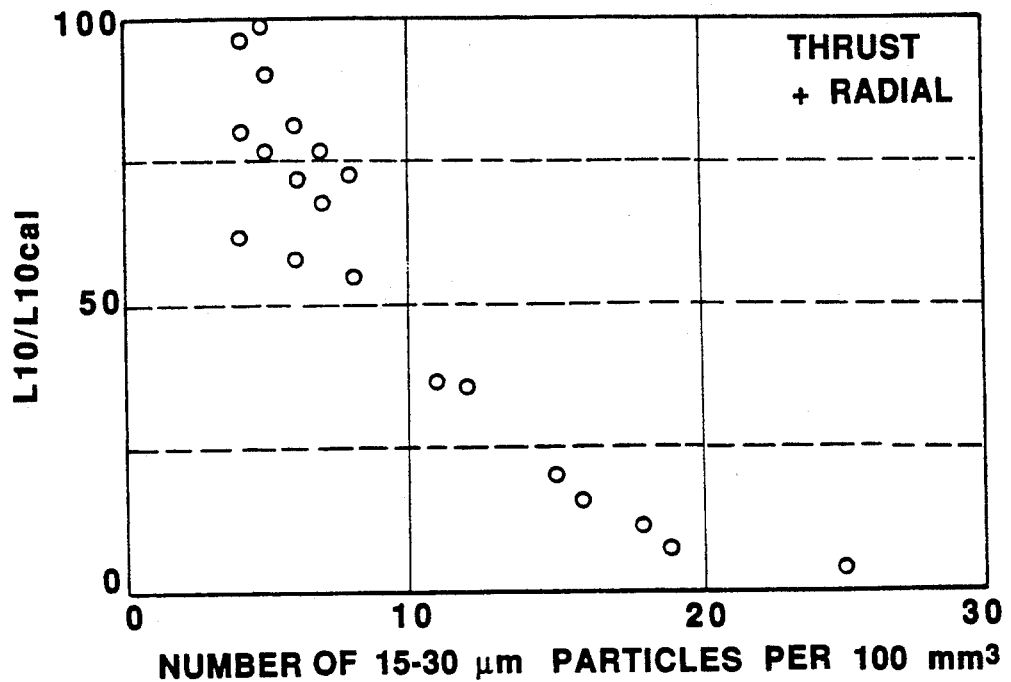
FIG. 15 is a graph of a characteristic relationship between the number of oxide or oxide-based inclusion particles with a 15 to 30 μm average particle size per unit volume A of 100 mm³ and bearing lives of rolling contact part.

The relationship between the number oxide or oxide-based inclusion particles in a given volume A equal to 100 mm$^3$ with 10 to 15 μm average particle size and oxide or oxide-based inclusion particles with 15–30 μm average particle size and bearing lives of disc-shaped test pieces and tested ball bearings was tested in the same manner as Example II. Tables 5 and 6 and FIG. 15 represent the results of this life test.

TABLE 5

Results of thrust-load type life test

| Charge No. | Number of inclusion particles | | Results of life test |
|---|---|---|---|
| | 15–30 μm | 10–15 μm | $L_{10}/L_{10}cal$ |
| 41 | 5 | 51 | 93 |
| 42 | 5 | 55 | 76 |
| 43 | 6 | 63 | 79 |
| 44 | 7 | 71 | 78 |
| 45 | 8 | 87 | 69 |
| 46 | 4 | 122 | 59 |
| 47 | 6 | 133 | 56 |
| 48 | 13 | 115 | 32 |
| 49 | 14 | 182 | 26 |
| 50 | 20 | 183 | 8 |

TABLE 6

Results of radial-load type life test

| Charge No. | Number of inclusion particles in unit area A | | Results of life test |
|---|---|---|---|
| | 15–30 μm | 10–15 μm | $L_{10}/L_{10}cal$ |
| 51 | 5 | 53 | 86 |
| 52 | 6 | 61 | 88 |
| 53 | 6 | 62 | 71 |
| 54 | 7 | 73 | 74 |
| 55 | 8 | 85 | 63 |
| 56 | 6 | 102 | 58 |
| 57 | 7 | 141 | 57 |
| 58 | 14 | 152 | 22 |
| 59 | 17 | 269 | 13 |
| 60 | 25 | 183 | 3 |

As seen in Tables 5 and 6 and FIG. 15, the bearing lives of the disc-shaped test pieces of Charge Nos. 41–45 and tested ball bearings of Charge Nos. 51–55, each of which has 10 or less oxide or oxide-based inclusion particles in a unit volume A of 100 mm$^3$ with 15 to 30 μm average particle size and 100 or less oxide or oxide-based inclusion particles in a given unit volume A of 100 mm$^3$ with 10 to 15 μm average particle size, are good.

On the other hand, the bearing lives of the disc-shaped test pieces of Charge Nos. 46 and 47 and tested ball bearings of Charge Nos. 56 and 57, each of which has above 100 oxide or oxide-based inclusion particles in a given volume A of 100 mm$^3$ with 10 to 15 μm average particle size, are lower than those of the disc-shaped test pieces of Charge Nos. 41–45 and tested ball bearings of Charge Nos. 51–55 but fell within the range $L_{10}/L_{10}cal > 50$. Long-lived test pieces and tested ball bearing should be defined so that the bearing lives thereof are with the range $L_{10}/L_{10}cal > 50$.

The bearing lives of the disc-shaped test pieces of Charge Nos. 48–50 and tested ball bearings of Charge Nos. 58–60, each of which has above 10 oxide or oxide-based inclusion particles in a given volume of 100 mm$^3$ with 15 to 30 μm average particle size, are much too low.

EXAMPLE IV

The relationship between the number of oxide or oxide-based inclusion particles in a given unit volume A of 100 mm$^3$ with 15 to 30 μm average particle size and oxide or oxide-based inclusion particles with 10 to 15 μm average particle size, contents of in-steel carbon and bearing lives of disc-shaped test pieces and tested ball bearings were determined using the same as set forth in Example IV.

An acid extraction method was employed to determine the number of the oxide or oxide-based inclusion particles per unit volume A of 100 mm$^3$ In the acid extraction method part of each of disc-shaped test pieces and tested single-row deep-grooved ball bearings was immersed in a strong acid, oxide or oxide-based inclusion particles which had been extracted but were not dissolved in the acid were collected, and analyzed by means of image processing.

Figure 16:
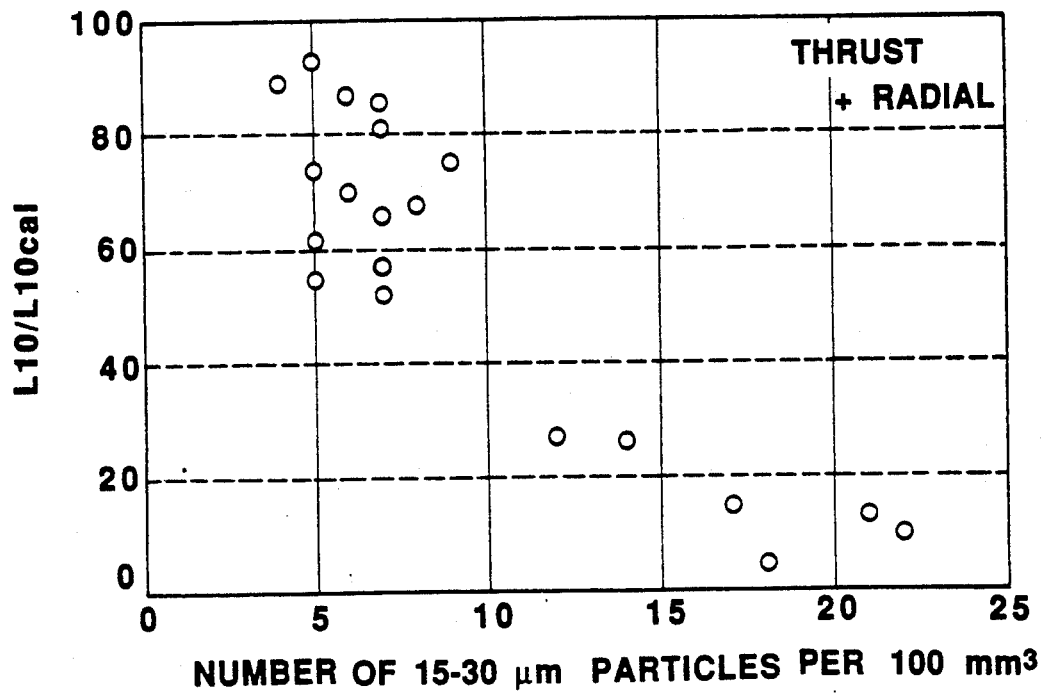
FIG. 16 is a graph of a characteristic relationship between the number of oxide or oxide-base inclusion particles with a 3 to 30 μm average particle size per unit volume A of 100 mm³ and bearing lives of rolling contact part.
Figure 17A:
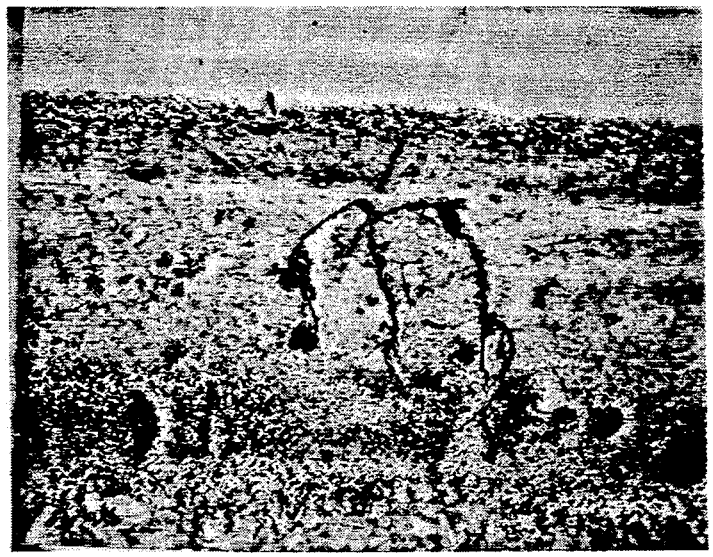
FIG. 17 is a photograph of the metal structure of sample discussed in Example VIII of the present invention, FIG. 17(1) representing an optical microscopic image of the structure of the sample before melting, FIG. 17(2) representing an SEM image of a raft in the sample after melting, FIG. 17(3) representing an SEM image of an accidentally detected inclusion in the sample before melting and FIG. 17(4) representing an SEM image of the inclusion of FIG. 17(3) selectively raised in the sample after melting.
Figure 17B:
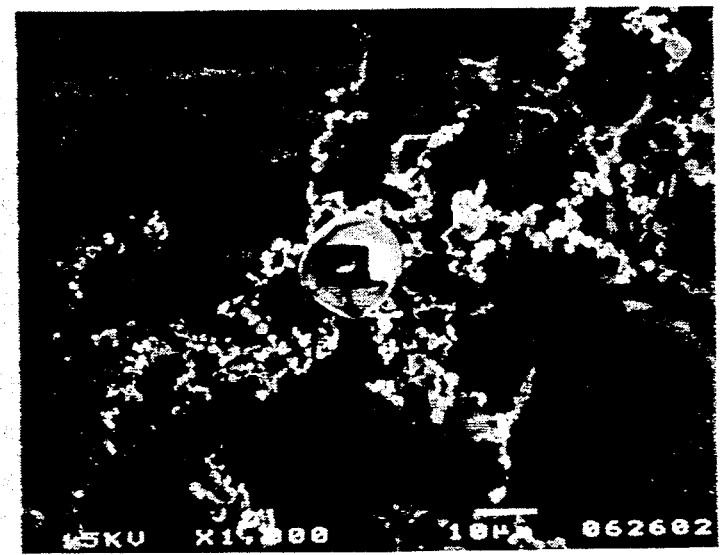
Figure 17C:
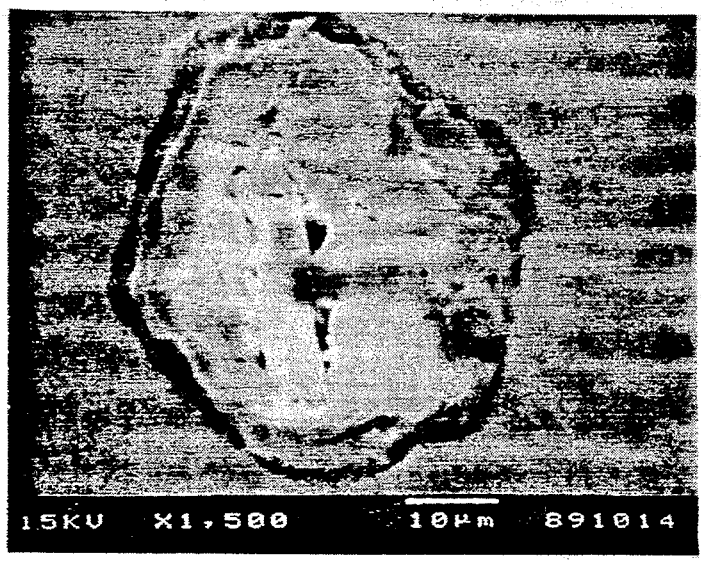
Figure 17D:
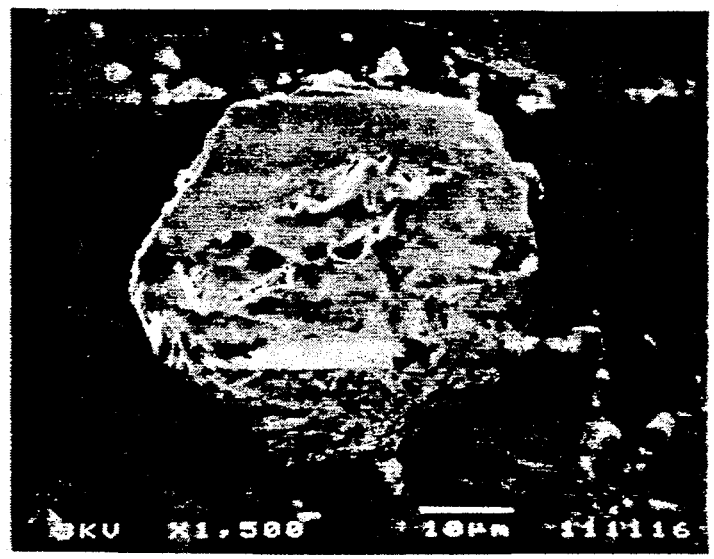
Figure 18A:
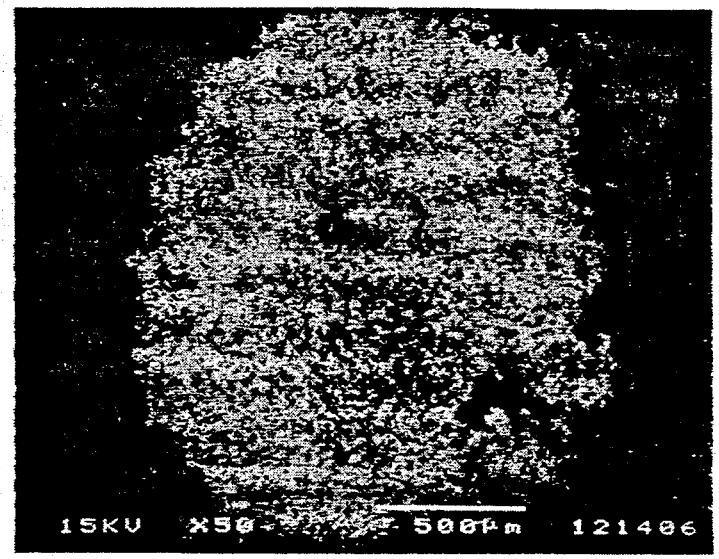
FIG. 18(1) is an SEM photographic image of a solidified surface of a metal structure after melting of SCr42OH steel employed in Example X of the present invention.
Figure 18B:
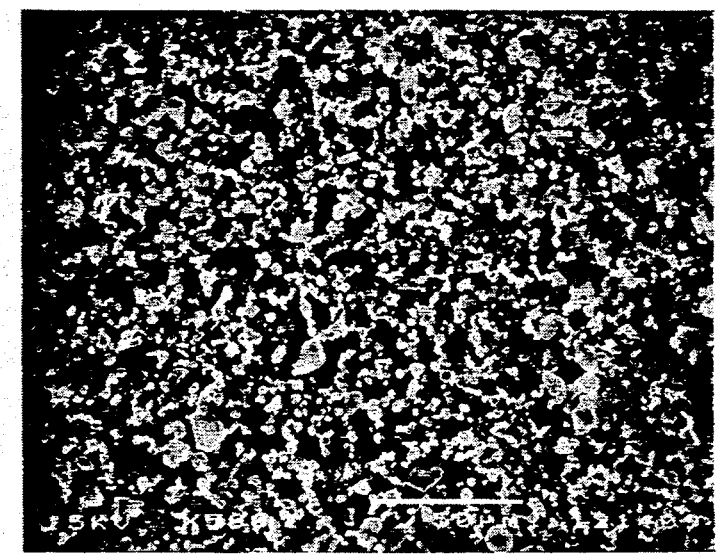
Figure 18C:
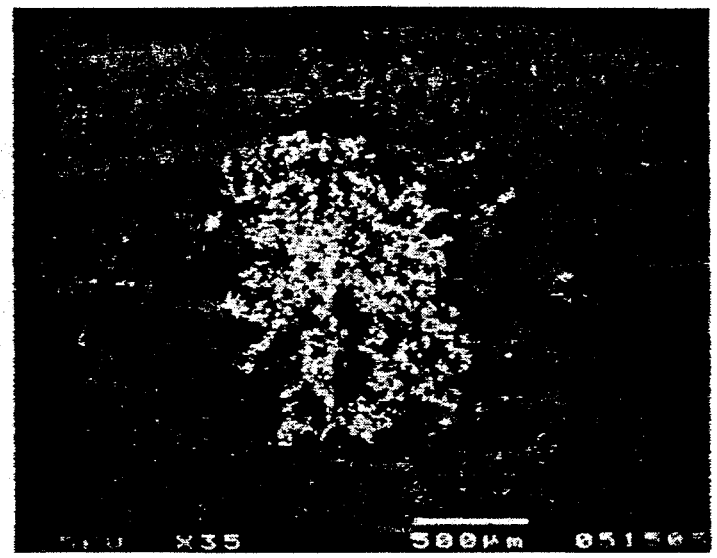
Figure 18D:
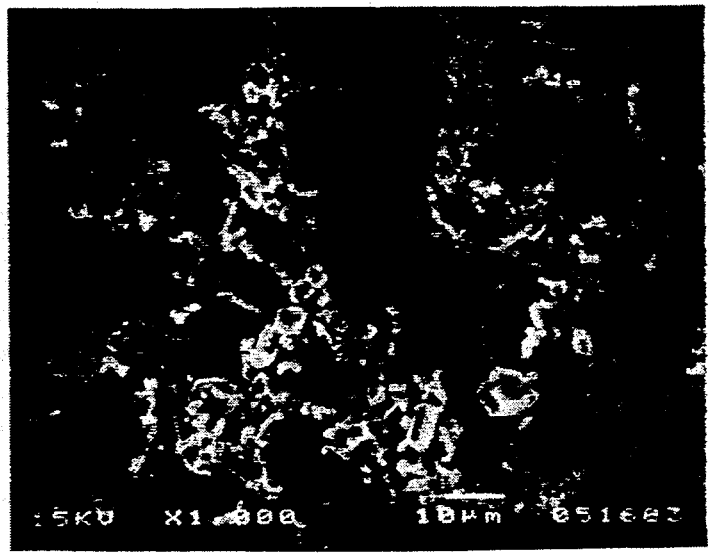
Figure 19A:
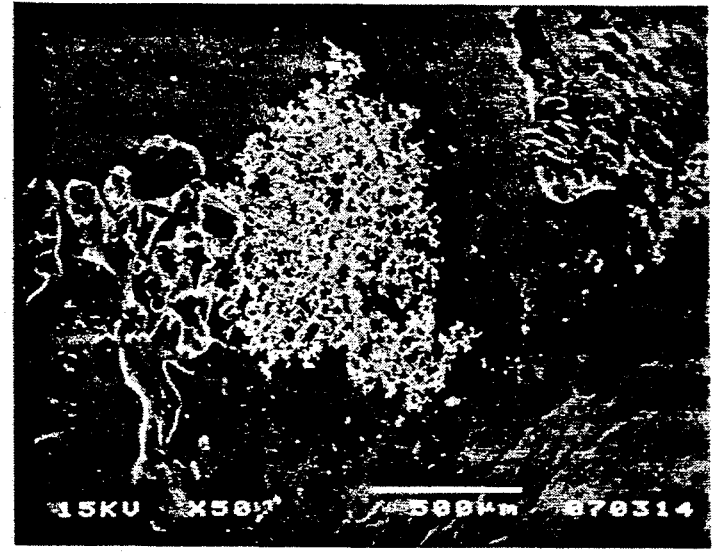
FIG. 19(1) is an SEM photographic image of the top surface after melting of a sample which has been decarburized employed in Example XI of the present invention.
Figure 19B:
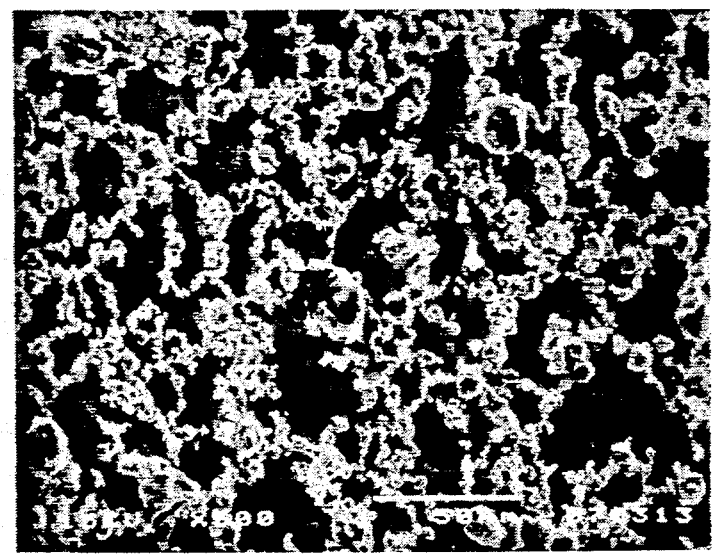
Figure 19C:
Figure 19D:
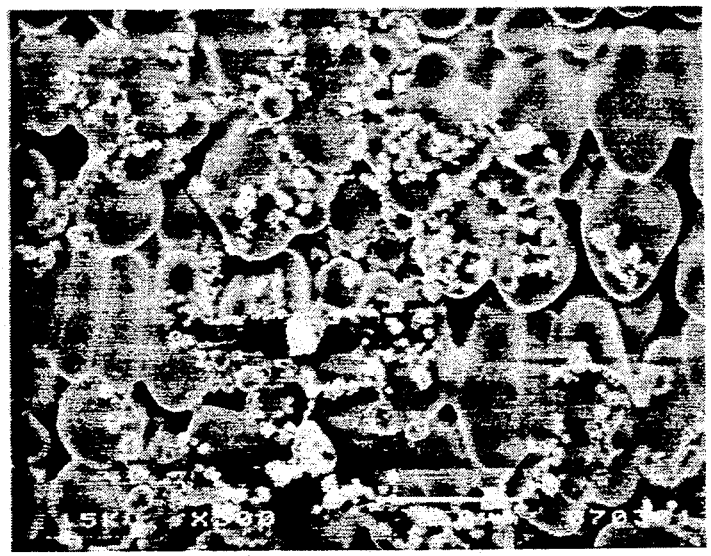

In this Example, a part of each of the disc-shaped test pieces and tested single-row deep-grooved ball bearings were also melted in a carbon crucible and oxygen liberated in the form of $CO_2$ was analyzed. Tables 7 and 8 and FIG. 16 represent the results of this life test.

TABLE 7

Results of thrust-load type life test

| Charge No. | Number of inclusion particles | | Content of in-steel | Results of life test |
|---|---|---|---|---|
| | 15–30 μm | 10–15 μm | oxygen ppm | $L_{10}/L_{10}cal$ |
| 61 | 5 | 52 | 7 | 98 |
| 62 | 5 | 57 | 9 | 89 |
| 63 | 7 | 66 | 5 | 79 |
| 64 | 4 | 73 | 11 | 76 |
| 65 | 6 | 88 | 12 | 73 |
| 66 | 4 | 102 | 12 | 61 |
| 67 | 8 | 110 | 9 | 54 |
| 68 | 12 | 70 | 11 | 35 |
| 69 | 16 | 110 | 7 | 16 |
| 70 | 19 | 194 | 16 | 7 |

TABLE 8

Results of radial-load type life test

| Charge No. | Number of inclusion particles | | Content of in-steel | Results of life test |
|---|---|---|---|---|
| | 15–30 μm | 10–15 μm | oxygen ppm | $L_{10}/L_{10}cal$ |
| 71 | 4 | 53 | 6 | 96 |
| 72 | 6 | 61 | 8 | 82 |
| 73 | 8 | 81 | 5 | 77 |
| 74 | 5 | 80 | 11 | 73 |
| 75 | 7 | 91 | 11 | 68 |
| 76 | 6 | 104 | 11 | 58 |
| 77 | 11 | 132 | 13 | 36 |
| 78 | 15 | 163 | 13 | 20 |
| 79 | 18 | 195 | 18 | 11 |
| 80 | 25 | 253 | 23 | 4 |

As seen in Tables 7 and 8 and FIG. 16, the bearing lives of the disc-shaped test pieces of Charge Nos. 61–63 and tested ball bearings of Charge Nos. 71–73, each of which has 10 or less oxide or oxide-based inclusion particles in a given volume A of 100 mm$^3$ with 15 to 30 μm average particle size and 100 or less oxide or oxide-based inclusion particles with 10 to 15 μm average particle size, and 9 ppm or less contents of in-steel oxygen, are good.

On the other hand, the bearing lives of the disc-shaped test pieces of Charge Nos. 64 and 65 and tested ball bearings of Charge Nos. 74 and 75, each of which has 10 or less oxide or oxide-based inclusion particles in a given volume A of 100 mm³ with 15 to 30 μm average particle size and 100 or less oxide or oxide-based inclusion particles in a given volume A of 100 mm³ with 10 to 15 μm average particle size, and above 9 ppm contents of in-steel oxygen are lower than those of the disc-shaped test pieces of Charge Nos. 61-63 and tested ball bearing of Charge Nos. 71-73 but for practical purposes sufficiently high.

Bearing lives of the disc-shaped test piece of Charge No. 67, which has below 10 oxide or oxide-based inclusion particles in a given volume A of 100 mm³ with 15 to 30 μm average particle size, above 100 oxide or oxide-based inclusion particles in a given volume A of 100 mm³ with 10 to 15 μm average particle size and a 9 ppm content of in-steel oxygen, the disc-shaped test piece of Charge No. 66 and tested ball bearing of Charge No. 76, each of which has below 10 oxide or oxide-based inclusion particles in a given volume A of 100 mm³ with 15 to 30 μm average particle size, above 100 oxide or oxide-based inclusion particles in a given volume A of 100 mm³ with 10 to 15 μm average particle size, and above 9 ppm contents of in-steel oxygen, are lower than those of the disc-shaped test pieces of Charge Nos. 61-65 and tested ball bearings of Charge Nos. 71-75 but within the range $L_{10}/L_{10}cal > 50$.

On the other hand, the bearing lives of the disc-shaped test piece of Charge No. 70 and tested ball bearings of Charge Nos. 77-80, each of which has above 10 oxide or oxide-based inclusion particles in a given volume A of 100 mm³ with 15 to 30 μm average particle size, above 100 oxide or oxide-based inclusion particles in a given unit volume A of 100 mm³ with 10 to 15 μm average particle size, and above 9 ppm contents of in-steel oxygen, are lower than acceptable.

The bearing life of the disc-shaped test piece of Charge No. 68, which has below 100 oxide or oxide-based inclusion particles in a given volume A of 100 mm³ with 10 to 15 μm average particle size, above 10 oxide or oxide-based inclusion particles in a given volume A of 100 mm³ with 15 to 30 μm average particle size, and an above 9 ppm content of in-steel oxygen, is lower than acceptable standards. The bearing life of the disc-shaped test piece of Charge No. 69, which has a below 9 ppm content of in-steel oxygen, above 100 oxide or oxide-based inclusion particles in a given unit volume A of 100 mm³ with 10 to 15 μm average particle size, above 10 oxide or oxide-based inclusion particles in a given unit volume A of 100 mm³ with 15 to 30 μm average particle size, is also lower than acceptable.

EXAMPLE V

An assortment of metal pieces were tested in essentially the same manner as outlined in Example IV. However, the procedure in this Example essentially differed from that in Example IV in that the oxide or oxide-based inclusion particles were analyzed by means of the electron beam melting extraction method employed in Example II. Tables 9 and 10 represent the results of this life test.

TABLE 9

| Charge No. | Results of thrust-load type life test | | | |
|---|---|---|---|---|
| | Number of inclusion particles | | Content of in-steel | Results of life test |
| | 15-30 μm | 10-15 μm | oxygen ppm | $L_{10}/L_{10}cal$ |
| 81 | 4 | 43 | 6 | 89 |
| 82 | 6 | 64 | 7 | 87 |
| 83 | 7 | 65 | 9 | 81 |
| 84 | 5 | 81 | 11 | 74 |
| 85 | 7 | 95 | 12 | 66 |
| 86 | 5 | 110 | 8 | 55 |
| 87 | 7 | 115 | 10 | 52 |
| 88 | 12 | 71 | 12 | 27 |
| 89 | 17 | 223 | 15 | 15 |
| 90 | 21 | 132 | 16 | 13 |

TABLE 10

| Charge No. | Results of radial-load type life test | | | |
|---|---|---|---|---|
| | Number of inclusion particles | | Content of in-steel | Results of life test |
| | 15-30 μm | 10-15 μm | oxygen ppm | $L_{10}/L_{10}cal$ |
| 91 | 5 | 59 | 8 | 93 |
| 92 | 7 | 75 | 9 | 86 |
| 93 | 9 | 85 | 6 | 75 |
| 94 | 6 | 89 | 12 | 70 |
| 95 | 8 | 91 | 11 | 68 |
| 96 | 5 | 105 | 9 | 62 |
| 97 | 7 | 108 | 12 | 57 |
| 98 | 14 | 84 | 13 | 26 |
| 99 | 18 | 224 | 20 | 6 |
| 100 | 22 | 122 | 23 | 11 |

The invention as set forth in Example V exhibits essentially the same characteristics of bearing life in Example IV. The evaluation accuracy of the method outlined in Example V, which evaluated the bearing life by means of the electron beam melting extraction evaluation method, is high.

EXAMPLE VI

Example VI determined the number of oxide or oxide-based inclusion particles in a given unit area A of 160 mm² with 3 to 30 μm average particle size and an abundance of oxide or oxide-based inclusion particles with 10 to 30 μm average particle size in the same manner as Example I and determined the number of oxide or oxide-based inclusion particles in a given unit volume A of 100 mm³ with 10 to 30 μm average particle size in the same manner as Example II. Thus, Example VI tested the bearing lives of the disc-shaped test pieces designated as Charge Nos. 101-110 and tested ball bearings designated as Charge Nos. 111-120.

Tables 11 and 12 represent the results of this life test.

TABLE 11

| Charge No. | Results of thrust-load type life test | | | |
|---|---|---|---|---|
| | Number of inclusion particles (area) | | Number of particles 15-30 μm (volume) | Results of life test |
| | 3-30 μm | 10-30 μm (%) | | $L_{10}/L_{10}cal$ |
| 101 | 51 | 0 | 5 | 99 |
| 102 | 57 | 0 | 6 | 81 |
| 103 | 60 | 1.7 | 6 | 73 |
| 104 | 77 | 1.3 | 8 | 72 |
| 105 | 61 | 1.6 | 11 | 52 |
| 106 | 50 | 0 | 11 | 56 |
| 107 | 50 | 2.0 | 13 | 40 |
| 108 | 76 | 2.6 | 13 | 35 |
| 109 | 122 | 4.1 | 14 | 26 |
| 110 | 161 | 5.6 | 16 | 16 |

TABLE 12

Results of radial-load type life test

| Charge No. | Number of inclusion particles (area) | | Number of particles 15-30 μm (volume) | Results of life test $L_{10}/L_{10cal}$ |
| --- | --- | --- | --- | --- |
| | 3-30 μm | 10-30 μm (%) | | |
| 111 | 43 | 0 | 4 | 96 |
| 112 | 62 | 0 | 6 | 89 |
| 113 | 72 | 1.4 | 7 | 76 |
| 114 | 45 | 0 | 11 | 55 |
| 115 | 71 | 1.4 | 11 | 51 |
| 116 | 43 | 2.3 | 12 | 46 |
| 117 | 73 | 2.7 | 13 | 32 |
| 118 | 91 | 3.3 | 13 | 30 |
| 119 | 151 | 4.6 | 15 | 19 |
| 120 | 183 | 5.5 | 18 | 11 |

As seen in Tables 11 and 12, the bearing lives of the disc-shaped test pieces of Charge Nos. 101-104 and tested ball bearings of Charge Nos 111-113, each of which has the number of the oxide or oxide-based inclusion particles in a given unit area A of 160 mm², the number in a given unit volume A 100 mm³ thereof and an abundance of oxide or oxide-based inclusion particles with 15 to 30 μm average particle size all being within the inventive ranges, are good.

On the other hand, the bearing lives of the disc-shaped test pieces of Charge Nos. 108-110 and tested ball bearing of Charge Nos. 116-120, each of which has the number of oxide or oxide-based inclusion particles in a given unit volume A of 100 mm³ with 15 to 30 μm average particle size and the number (i.e., abundances) of the oxide or oxide-based inclusion particles in a given area A of 160 mm² all being with the inventive ranges, are very low.

The bearing lives of the test pieces of Charge Nos. 105-107 and tested ball bearings of Charge Nos. 114 and 115, each of which has above 10 oxide or oxide-based inclusion particles in a given unit volume of 160 mm² with 3 to 30 μm average particle size and 2% or less abundances of oxide or oxide-based inclusion particles with 50 to 30 μm average particle size, are less in a reduction in bearing life than those of the disc-shaped test pieces of Charge Nos. 108-110 and tested ball bearings of Charge Nos. 116-120.

Examples I-VI have not described the number of inclusion particles average particle sizes above 30 μm. Limiting the numbers of the oxide or oxide-based inclusion particles to those within the inventive ranges finally reduced the number of inclusion particles with average particle sizes above 30 μm. Thus, Examples I-VI can provide a long-lived bearing steel and rolling bearings.

EXAMPLE VII

Ten samples having an area of 0.41 cm³ cut from the same carburized bearing steel SCr42OH were set in the water-cooled copper crucible of the electron beam melting apparatus shown in FIG. 13. In this Example, the samples were with varied electric charge powers and varied power charge times as shown in Table 13. The corresponding penetration depths in the samples were measured.

A combination of fixing beam acceleration voltage of the electron beam melting apparatus at 10 kV and changing the beam current thereof controlled the electric charge power. The pressure in the vacuum chamber defined by vessel 41 was between $10^{-7}$ and $10^{-6}$ Torr.

The voltage and current controller 49 preset an electric charge power for each sample.

The motor controller 50 preset an electric power-charge time for each sample. The electron beam melting apparatus interrupted irradiation of electron beam onto a particular sample after a corresponding electric power change time had elapsed, rotated the water-cooled copper crucible one pitch and then reopened an electron beam melting of a next sample with a predetermined electric charge power for a predetermined charge time.

Penetration depth in each sample was computed from a residual or postmelting length of a preworked through-hole with a 0.5-mm diameter normal to the top surface of each sample. That is, the length of the original length of the through-hole minus the residual length thereof provides the penetration depth.

As seen in FIG. 8, a range of electric charge power J in which an electric power charge time control can control a penetration depth in sample can be expressed by the expression $243.5 \, W < J < 487 \, W$ since the sample volume is 0.41 cm³.

Table 13 represents the relationship between electric charge powers (W), electric power charge time (s) and penetration depths (mm) for samples Nos. 1-10.

TABLE 13

| Sample No. | Electric charge power (W) | Charge time (s) | Penetration depth (mm) |
| --- | --- | --- | --- |
| 1 | 100 | 15 | 0.3 |
| 2 | 100 | 20 | 0.9 |
| 3 | 100 | 30 | 0.7 |
| 4 | 300 | 15 | 0.2 |
| 5 | 300 | 16 | 0.4 |
| 6 | 300 | 17 | 0.9 |
| 7 | 300 | 18 | 1.2 |
| 8 | 700 | 5 | 1.0 |
| 9 | 700 | 6 | 4.9 |
| 10 | 700 | 7 | completely melted |

As seem in Table 13, electric charge powers for the Sample Nos. 4-7 fall within the FIG. 8 range and the charge times and penetration depths for the Sample Nos. 4 to 7 have an essentially proportional relationship, so that controlling charge times for the Sample Nos. 4 to 7 can control penetration depths On the other hand, electric charge powers for the Sample Nos. 1-3 below the FIG. 8 range. The Sample Nos. 1-3 experienced nonuniform melting, so that the charge times and penetration depths for the Sample Nos 1-3 have no significant correlation. In addition, electric charge powers for the Sample Nos. 8-10 exceed the FIG. 8 range and a penetration depth a second of each of the Sample Nos. 8-10 is high, so that controlling penetration depths in sample is difficult in the course of complete melting.

EXAMPLE VIII

Disc-shaped test pieces were made of high-carbon chromium bearing steel class II (SUJ-2).

Bearing steel samples were obtained for evaluation and testing. It can be appreciated that the bearing steel may be prepared by a variety of methods, including vacuum induction melting (VIM), vacuum arc remelting (VAR), electro slag remelting, etc. Furthermore, these methods may be used individually or in combination (eg., a combination of VIM-VAR).

In the present instance, samples of bearing steels were prepared in the following manner. Scraps of steel were melted by an electric furnace or blast furnace to produce melted pig iron. The pig iron was transferred to a basic oxygen furnace and the components were adjusted as necessary. This melted steel was transferred to a ladle furnace and a vacuum degassing process was applied to a desired bearing steel.

A thrust-load type testing machine described on pages 19-21, "Special Steels Manual" (1st edition), edited by Electrosteelmaking Institute, published by Rikogakusha May 25, 1965 and an AE apparatus described on Japanese Lubrication Engineers Society, brief for the 33rd Spring Study Presentation Meeting (1989) together located an origin or microcrack in each of the disc-shaped test pieces. The location of the origin of microcrack were conducted as follows:

The thrust-load type life testing machine exerted a repeated shearing stress on each of the disc-shaped test pieces and caused a microcrack in each disc-shaped test piece from the origin or oxide or oxide-based nonmetal inclusion and a concurrent AE. Distinguishing the AE caused by the microcrack from an AE derived from a different cause locates the origin or microcrack and immediately stops the thrust-load type life testing machine.

Then, separating a part of a disc-shaped test piece for thrust-load type life test experiencing a microcrack and a surrounding part into 10-mm square and 6-mm thick rectangular plates provided samples used in the electron beam melting method.

The electron beam melting apparatus depicted in FIG. 13 melted the samples so that a 400 W electric charge power was charged for 14 sec. The 400 W electric charge power falls within the range depicted by the hatched range so that the 14 sec charge time allowed a part to be selectively melted between the top surface of a melted sample extending to a 0.2-mm depth.

FIG. 17(1) is an optical microscope produced image (x 400) of the structure of a raceway surface as it appeared before melting after completion of the AE test. The presence of a microcrack is visible in FIG. 17(1) as a dark line near the center of that image. FIG. 17(2) is a photograph of an SEM image of a raft produced by the electron beam melting method of the present invention on the top of a sample. FIG. 17(2) establishes that a visible white inclusion is present on the top surface of a solidified structure in a sample.

FIG. 17(3) is an SEM image of an inclusion accidentally detected in the process of inspection of a nonmetal inclusion present in the tip surface of a metal sample. FIG. 17(3) establishes the presence of a large inclusion at the center thereof.

FIG. 17(4) is an SEM image of a raft selectively raised from the FIG. 17(3) large inclusion by electron beam melting. FIG. 17(4) establishes that the large inclusion shown in FIG. 17(3) was stably raised to the top surface of a same while maintaining its size and configuration. Thus, the method outlined in Example VIII can selectively separate an inclusion capable of causing a microcrack, even without the need of a life test for a disc-shaped test piece or tested ball bearing, and can monitor and evaluate the inclusion thereby to increase the guarantee of accuracy for cleanness of a tested bearing steel and guarantee the accuracy of predictions bearing life of the tested bearing steel.

EXAMPLE IX

Six Samples, Nos. 11 to 16, made of bearing steels having carbon concentrations different from that of SCr42OH and a Sample No. 17 made of SUJ-2 were set in the electron beam melting apparatus depicted in FIG. 13 in the same manner as outlined in Example VII. The electron beam melting apparatus completely melted each of the Sample Nos. 11-17 so that the electric charge power J was within the range $J \geq 700 \text{ V} + 200$ (W), wherein V represents a sample volume in cm$^3$. In this case, the weight of each sample was 2 g, the volume of each sample was 0.26 cm$^3$, an electric charge power for producing electron beam was 700 W, which falls within the inventive range, and an electric power charge time was 5 sec.

The electron beam melting apparatus completely melted each sample and raised an oxide or oxide-based nonmetal inclusion.

Bearing steel samples were obtained for evaluation and testing. It can be appreciated that the bearing steel may be prepared by a variety of methods, including vacuum induction melting (VIM), vacuum arc remelting (VAR), electro slag remelting, etc. Furthermore, these methods may be used individually or in combination (eg., a combination of VIM-VAR).

In the present instance, samples of bearing steels were prepared in the following manner. Scraps of steel were melted by an electric furnace or blast furnace to produce melting pig iron. The pig iron was transferred to a basic oxygen furnace and the components were adjusted as necessary. This melted steel was transferred to a ladle furnace and a vacuum degassing process was applied to a desired bearing steel.

By monitoring an SEM image of the sample which had been cooled, the number of oxide or oxide-based inclusion particles with having an average particle size of 20 μm or more and a ration of the projection area of flat surface to the projection area of monitored surface could be provided. Table 14 represents the result of these measurements.

TABLE 14

| Sample No. | Carbon concent. (wt %) | Flat surface ratio (%) | Inclusion particle number (>20 μm) |
|---|---|---|---|
| 11 | 0.05 | 35 | (57) |
| 12 | 0.16 | 100 | 26 |
| 13 | 0.21 | 100 | 12 |
| 14 | 0.33 | 100 | 14 |
| 15 | 0.42 | 100 | 9 |
| 16 | 0.71 | 39 | (5) |
| 17 | 1.01 | 4 | — |

The Sample Nos. 12-15 of Table 14 indicated no occurrence of dendritic structure and had the 100% flat surface ratio. Thus, oxide or oxide-based inclusion particles were uniformly distributed throughout the Sample Nos. 12-15 which facilitated measurement of the number of oxide or oxide-based inclusion particles. Thus, measurement of the number of oxide or oxide-based inclusion particles in Sample Nos. 12-15 is not adversely affected by dendritic structure, indicating that the results of the measurement method are sufficiently reliable.

On the other hand, since low carbon concentration in Sample No. 11 failed to provide a highly clean steel, the flat surface ratio of the Sample No. 11 was very low. Part of oxide or oxide-based inclusion particles were distributed in a nonflat surface, which made a measurement of the number of oxide or oxide-based inclusion particles incomplete. Since a high carbon concentration in Sample No. 16 produced a dendritic structure, the flat surface ratio of the Sample No. 16 was very low and part of oxide or oxide-based inclusion particles were distributed in the unflat surface, which made measurement of the number of oxide or oxide-based inclusion particles incomplete. Since the Sample No. 17 did not have a predominately flat surface but had a dendritic structure essentially therethroughout, oxide or oxide-based inclusion particles were sharply concentrated, which made measurement of the number of oxide or oxide-based inclusion particles practically impossible.

EXAMPLE X

SCr42OH of the Sample No. 12 of Table 14 and SUJ-2 of the Sample No. 17 were formed in 8 mm × 8 mm × 5 mm rectangular plates.

Bearing steel samples were obtained for evaluation and testing. It can be appreciated that the bearing steel may be prepared by a variety of methods, including vacuum induction melting (VIM), vacuum arc remelting (VAR), electro slag remelting, etc. Furthermore, these methods may be used individually or in combination (eg., a combination of VIM-VAR).

In the present instance, samples of bearing steels were prepared in the following manner. Scraps of steel were melted by an electric furnace or blast furnace to produce melted pig iron. The pig iron was transferred to a basic oxygen furnace and the components were adjusted as necessary. This melted steel was transferred to a ladle furnace and a vacuum degassing process was applied to a desired bearing steel.

The electron beam melting apparatus completely melted each of the Sample Nos. 12 and 17 with 700 W electric power charged for 6 sec.

FIG. 18(1) is a photograph of an SEM image of the top surface of a solidified structure produced after the complete melting and a subsequent solidification of SCr42OH of the Sample No. 12. FIG. 18(1) is a distribution of visible white rafts. FIG. 18(2) is an enlargement of part of FIG. 18(1).

FIGS. 18(1) and 18(2) establish that the postsolidified top surface of the Sample No. 12 had experienced the occurrence of dendritic structure, was flat and had a uniform distribution of oxide or oxide-based inclusion particles therein.

FIG. 18(3) is a photograph of an SEM image of the top surface of a solidified structure produced by the complete melting and a subsequent solidification of SUJ-2 steel of Sample No. 17. FIG. 18(3) is a distribution of visible white rafts. FIG. 18(4) is an enlargement of part of FIG. 18(3).

FIGS. 18(3) and 18(4) establish that the postsolidified top surface of Sample No. 17 has a dendritic structure developed therein, lacks flatness and has a very rough structure, indicating that a distribution of oxide or oxide-based inclusion particles is adversely affected by the rough structure to be nonuniform.

EXAMPLE XI

Bearing steel samples were obtained for evaluation and testing. It can be appreciated that the bearing steel may be prepared by a variety of methods, including vacuum induction melting (VIM), vacuum arc remelting (VAR), electro slag remelting, etc. Furthermore, these methods may be used individually or in combination (eg., a combination of VIM-VAR).

In the present instance, samples of bearing steels were prepared in the following manner. Scraps of steel were melted by an electric furnace or blast furnace to produce melted pig iron. The pig iron was transferred to a basic oxygen furnace and the components were adjusted as necessary. This melted steel was transferred to a ladle furnace and a vacuum degassing process was applied to a desired bearing steel.

A test piece made of SUJ-2 high-carbon chromium steel was decarburized in a heated standard atmosphere at 900° C. for 20 hr so that the average carbon concentration at a location 1-mm deep on a melted part was 0.06–0.6 wt %. The test piece was separated into 0.24 cm³ rectangular parallelepipeds to provide samples to be used in the electron beam melting method of the present invention. A control sample made of SUJ-2 high-carbon chromium steel which was not decarburized was separated into 0.24 cm³ rectangular parallelepipeds to provide controlling samples for use in the electron beam melting method.

In the electron beam melting method, the top surface of each of the samples was melted with the electron beam melting apparatus shown in FIG. 13 with 350 W electric power charged for 17 sec. and the top surface was then cooled.

FIG. 19(1) is a photograph of an SEM image of the postmelting top surface produced by the electron beam melting method of a sample which has been decarburized, representing a distribution of visible white rafts. FIG. 19(2) is an enlargement of part of FIG. 19(1).

FIGS. 19(1) and 19(2) establish that a solidified top surface of the sample did not experience the occurrence of dendritic structure has a wide flat surface an essentially uniform distribution of oxide or oxide-based inclusion particles.

FIG. 19(3) is a photograph of an SEM image of the postmelting top surface produced by the electron beam melting method of a sample which has not been decarburized, representing a distribution of visible white rafts. FIG. 19(4) is an enlargement of part of FIG. 19(3).

FIGS. 19(3) and 19(4) establish that a solidified top surface of the sample has developed a wide dendritic structure which lacks flatness and has a very rough structure. The dendritic arms entrap part of oxide or oxide-based inclusion particles therebetween.

Thus, electron beam melting in accordance with the present invention of a sample which is made of a high-carbon chromium bearing steel with a (carbon concentration exceeding the range 0.06–0.6 wt %), which has been previously decarburized so that the average carbon concentration is 0.06–0.6 wt % securely prevents a production of dendritic structure. Consequently, monitoring and evaluation of oxide or oxide-based inclusion particles in a sample can be conducted without impedance.

What is claimed is:

1. A bearing steel having inclusion particles composed of oxides, inclusion particles composed of oxide-based materials or inclusion particles composed of mixtures of oxides and oxide based materials, such that, in a given area of 160 mm², the number of inclusion particles having an average particle size between 3 to 30 μm is less than about 80 and the amount of inclusion particles having an average particle size greater than about 10 μm is less than 2% of the total number of inclusion particles having an average particle size between 3 to 30 μm, wherein the number of inclusion particles per 100 mm³ having an average particle size of 15 to 30 μm less than about 10.

2. A bearing steel having inclusion particles composed of oxides, inclusion particles composed of oxide-based materials or inclusion particles composed of mixtures of oxides and oxide based materials, such that, in a given area of 160 mm², the number of inclusion particles having an average particle size between 3 to 30 μm is less than about 80 and the amount of inclusion particles having an average particle size greater than about 10 μm is less than 2% of the total number of inclusion particles having an average particle size between 3 to 30 μm, wherein the number of inclusion particles per 100 mm³ having an average particle size of 10 to 15 μm is less than about 100.

3. The bearing steel as recited in claim 1, wherein the number of inclusion particles in a given sample having a volume of 100 mm³ having an average particle size of 10 to 15 μ is less than about 100.

4. The bearing steel as recited in claim 2, wherein irradiation by an electron beam is used in accordance with an electron beam melting extraction evaluation method to apply electric power, J, in a power range to ensure that the number each kind of inclusion particle per 100 mm³ falls within the defined range, the power range defined by the equation:

$$350V + 100 \leq J \leq 700V + 200;$$

wherein J is electric charge power in watts provided by the electron beam and V is sample volume in cm³.

5. The bearing steel as recited in claim 3, wherein irradiation by an electron beam is used in accordance with an electron beam melting extraction evaluation method to apply electric power, J, in a specified power range to ensure that the number of of the inclusion particles per 100 mm³ falls within the defined range, the power range defined by the equation:

$$350V + 100 \leq J \leq 700V + 200;$$

wherein J is electric power in watts provided by the electron beam and V is sample volume in cm³.

6. The bearing steel as recited in claim 4, wherein irradiation by an electron beam is used in accordance with an electron beam melting extraction evaluation method to apply electric power, J, in a power range to ensure that the number of the inclusion particles per 100 mm³ falls within the defined range, the power range defined by the equation:

$$350V + 100 \leq J \leq 700V + 200;$$

wherein J is electric power in watts provided by said electron beam and V is sample volume in cm³.

7. The bearing steel as recited in claim 1, wherein carbon concentration is 0.06–0.6 wt % and irradiation by an electron beam is used in accordance with an electron beam melting extraction evaluation method to ensure that the number of each kind of inclusion particles per 100 mm³ falls within one of said ranges.

8. The bearing steel as recited in claim 2, wherein carbon concentration is 0.06–0.6 wt % and irradiation by an electron beam is used in accordance with an electron beam melting extraction evaluation method to ensure that the number of each kind of inclusion particle per 100 mm³ falls within one of said ranges.

9. The bearing steel as recited in claim 3, wherein carbon concentration is 0.06–0.6 wt % and irradiation by an electron beam is used in accordance with an electron beam melting extraction evaluation method to ensure that the number of each kind of inclusion particle falls within one of said ranges.

10. The bearing steel as recited in claim 8, wherein irradiation by said electron beam occurs under the following condition:

$$350V + 100 \leq J \leq 700 + 200;$$

wherein J is electric power in watts provided by said electron beam and V is sample volume in cm³.

11. The bearing steel as recited in claim 9, wherein irradiation by said electron beam occurs under the following condition:

$$350V + 100 \leq J \leq 700V + 200;$$

wherein J is electric power in watts provided by said electron beam and V is sample volume in cm³.

12. The bearing steel as recited in claim 10, wherein irradiation by said electron beam occurs under the following condition:

$$350V + 100 \leq J \leq 700V + 200;$$

wherein J is electric power in watts provided by said electron beam and V is sample volume in cm³.

13. The bearing steel as recited in claim 7, wherein the carbon concentration value is determined after decarburization.

14. The bearing steel as recited in claim 8, wherein the carbon concentration value is determined after decarburization.

15. The bearing steel as recited in claim 9, wherein the carbon concentration value is determined after decarburization.

16. A bearing steel, wherein inclusion particles having an average particle size of 15 to 30 μm are present in a number less than about 10 per 100 mm³, wherein said inclusion particles are composed of oxides, oxide based materials, or mixtures of oxides and oxide-based materials.

17. The bearing steel as recited in claim 16, wherein the number of inclusion particles per 100 mm³ having an average particle size of 10–15 μm is less than about 100, the inclusion particles being oxides, oxide based materials or mixtures of oxides and oxide based materials.

18. The bearing steel as recited in claim 17, wherein irradiation by an electron beam is used in accordance with an electron beam melting extraction evaluation method to apply electric power, J, in a specified power range to ensure that the number of each kind of inclusion particle per 100 mm³ falls within a defined range, and the electric power range is defined by the equation:

$$350V + 100 \leq J \leq 700V + 200;$$

wherein J is electric power in watts provided by said electron beam and V is sample volume in cm³.

19. The bearing steel as recited in claim 18, wherein irradiation by an electron beam is used in accordance with an electron beam melting extraction evaluation method to apply electric power, J, in a specified power range to ensure that the number of each kind of inclusion particle per 100 mm³ falls within a range defined and the electric power range is defined by the equation:

$$350V + 100 \leq J \leq 700V + 200;$$

wherein J is electric power in watts provided by said electron beam and V is sample volume in cm³.

20. The bearing steel as recited in claim 16, having a carbon concentration of 0.06–0.6 wt % wherein irradiation by an electron beam is used in accordance with an electron beam melting extraction evaluation method to ensure that the number of each kind of inclusion particle per 100 mm³ falls within one of said ranges.

21. The bearing steel as recited in claim 17, having a carbon concentration of 0.06–0.6 wt % wherein irradiation by an electron beam is used in accordance with an electron beam melting extraction evaluation method to ensure that the number of each kind of the oxide or oxide-base inclusion particle per 100 mm³ falls within one of said ranges.

22. The bearing steel as recited in claim 21, wherein irradiation by the electron beam is used in accordance with the electron beam extraction evaluation method to apply electric power, J, as defined by the equation:

$$350V+100 \leq J \leq 700V+200;$$

wherein J is electric power in watts provided by said electron beam and V is sample volume in cm³.

23. The bearing steel as recited in claim 22, wherein irradiation by the electron beam is used in accordance with the electron beam extraction evaluation method to apply electric power, J, as defined by the equation:

$$350V+100 \leq J \leq 700V+200;$$

wherein J is electric power in watts provided by said electron beam and V is sample volume in cm³.

24. The bearing steel as recited in claim 20, wherein the carbon concentration value is determined after decarburization.

25. The bearing steel as recited in claim 21, wherein the carbon concentration value is determined after decarburization.

26. The bearing steel, wherein the number of inclusion particles per 100 mm³ and the amount of inclusion particles having an average particle size greater than about 10 μm is less than 2% of the total number of inclusion particles having an average particle size between 3 to 30 μm having an average particle size of 10 to 15 μm is less than about 100, and the amount of inclusion particles per 100 mm³ having an average size greater than about 10 μm is less than 2% of the total number of inclusion particles having an average particle size between 3 to 30 μm, wherein said inclusion particles are composed of oxides, oxide-based materials or mixtures of oxides and oxide-based materials.

27. The bearing steel as recited in claim 26, wherein irradiation by an electron beam is used in accordance with an electron beam melting extraction evaluation method to apply electric power, J, in a defined power range to ensure that the number of each kind inclusion particle per 100 mm³ falls within a range defined as:

$$350V+100 \leq J \leq 700V+200;$$

wherein J is electric power in watts provided by said electron beam and V is sample volume in cm³.

28. The bearing steel as recited in claim 26, having a carbon concentration of 0.06–0.6 wt % wherein irradiation by an electron beam is used in accordance with an electron beam melting extraction evaluation method to ensure that the number of each kind of inclusion particle per 100 mm³ falls within one of said ranges.

29. The bearing steel as recited in claim 28, wherein irradiation by the electron beam used in the electron beam melting extraction evaluation method occurs under the following condition:

$$350V+100 \leq J \leq 700V+200;$$

wherein J is electric power in watts provided by said electron beam and V is sample volume in cm³.

30. The bearing steel as recited in claim 28, wherein the carbon concentration value is determined after decarburization.

31. A rolling bearing, wherein at least one race and a rolling element of the rolling bearing are made or the bearing steel of claim 1.

32. A rolling bearing, wherein at least one race and a rolling element of the rolling bearing is made of the bearing steel of claim 2.

33. A rolling bearing, wherein at least one race and a rolling element of the rolling bearing is made of the bearing steel of claim 3.

34. A rolling bearing, wherein at least one race and a rolling element of the rolling bearing is made of the bearing steel of claim 16.

35. A rolling bearing, wherein at least one race and a rolling element of the rolling bearing is made of the bearing steel of claim 17.

36. A rolling bearing, wherein at least one race and a rolling element of the rolling bearing is made of the bearing steel of claim 26.

* * * * *